US005761413A

United States Patent [19]
Frank et al.

[11] Patent Number: 5,761,413
[45] Date of Patent: Jun. 2, 1998

[54] FAULT CONTAINMENT SYSTEM FOR MULTIPROCESSOR WITH SHARED MEMORY

[75] Inventors: Steven J. Frank, Hopkinton; William F. Mann, Sudbury, both of Mass.

[73] Assignee: Sun Microsystems, Inc., Mountain View, Calif.

[21] Appl. No.: 462,759

[22] Filed: Jun. 5, 1995

Related U.S. Application Data

[63] Continuation of Ser. No. 763,677, Sep. 23, 1991, abandoned, which is a continuation-in-part of Ser. No. 136,930, Dec. 22, 1987, Pat. No. 5,055,999, Ser. No. 696,291, May 20, 1991, Pat. No. 5,119,481, Ser. No. 370,325, Jun. 22, 1989, abandoned, Ser. No. 370,341, Jun. 22, 1989, Pat. No. 5,297,265, Ser. No. 370,287, Jun. 22, 1989, Pat. No. 5,251,308, Ser. No. 499,182, Mar. 26, 1990, Pat. No. 5,335,325, Ser. No. 521,798, May 10, 1990, Pat. No. 5,282,201, Ser. No. 526,396, May 18, 1990, Pat. No. 5,226,039, and Ser. No. 531,506, May 31, 1990, Pat. No. 5,341,483.

[51] Int. Cl.$^6$ .................................................. G06F 11/00
[52] U.S. Cl. ............................................. 395/185.02
[58] Field of Search ......................... 371/11, 12; 395/575, 395/725, 325, 185.01, 185.02, 185.07, 185.09; 370/217, 553, 356; 348/466

[56] References Cited

U.S. PATENT DOCUMENTS

| Re. 28,811 | 5/1976 | Pierce | 179/15 |
|---|---|---|---|
| 3,713,096 | 1/1973 | Comfort et al. | 340/172 |
| 3,723,976 | 3/1973 | Alvarez et al. | 340/172.5 |
| 3,731,002 | 5/1973 | Pierce | 370/85 |
| 3,735,362 | 5/1973 | Ashany et al. | 340/172 |
| 3,748,647 | 7/1973 | Ashany et al. | 340/172 |
| 3,749,897 | 7/1973 | Hirvela | 235/153 |
| 3,800,291 | 3/1974 | Cocke et al. | 340/172.5 |
| 4,011,545 | 3/1977 | Nadir | 340/172 |
| 4,031,512 | 6/1977 | Faber | 340/147 |
| 4,077,059 | 2/1978 | Cordi et al. | 364/200 |

(List continued on next page.)

FOREIGN PATENT DOCUMENTS

| 0014926 | 2/1980 | European Pat. Off. |
| 0233993 | 4/1982 | European Pat. Off. |
| 86 11 4191 | 3/1986 | European Pat. Off. |
| 0 211 613 | 2/1987 | European Pat. Off. |
| 0214718 | 3/1987 | European Pat. Off. |

(List continued on next page.)

OTHER PUBLICATIONS

*MCS–80/85 Family User's Manual* (Oct. 1979), Intel.
Titus, 8080/8085 Software Design.
Uffenbeck, "Microcomputers and Microprocessors" (Prentice Hall, 1985), Sec. 6.5–7.4, pp. 257–332.
Proc. of the 6th Annual Phoenix Conf. on Computer and Communications, 25–27 Feb. 1987, pp. 14–17.
European Search Report for EP 91 30 4493.
IBM Technical Disclosure "High Performance/High Availability Interprocessor Communication Method" 1988.

(List continued on next page.)

*Primary Examiner*—Albert Decady

[57] ABSTRACT

A multiprocessor system has a plurality of processing cells, each including a processor and memory, interconnected via a network. The memories respond to requests by the processors for accessing data and, absent fault, transmitting it in response packets to at least to the requesting processors. A fault containment element responds to at least certain faults during access or transmission of a datum for including within the respective response packet a fault signal that prevents the requestor from accessing the datum. If a fault is detected in a datum not previously detected as faulty, a marking element can include a "marked fault" signal in the response packet. Whereas, it can include an "unmarked fault" signal when it detects a fault associated with a requested datum, but not specifically isolated to that datum. When a request is made for a datum which had previously been detected as faulty, the marking element can include in the response packet a "descriptor fault" signal. This facilitates identification of a particular source of an error and prevents that error from propagating to other processing cells.

35 Claims, 12 Drawing Sheets

| | | | |
|---|---|---|---|
| 4,141,067 | 2/1979 | McLagan | 364/200 |
| 4,240,143 | 12/1980 | Besemer et al. | 364/200 |
| 4,245,306 | 1/1981 | Besemer et al. | 364/200 |
| 4,293,910 | 10/1981 | Flusche et al. | 364/200 |
| 4,322,795 | 3/1982 | Lange et al. | 364/200 |
| 4,334,305 | 6/1982 | Girardi | 370/86 |
| 4,358,823 | 11/1982 | McDonald | 364/200 |
| 4,394,731 | 7/1983 | Flusche et al. | 364/200 |
| 4,410,944 | 10/1983 | Kronies . | |
| 4,410,946 | 10/1983 | Spencer | 364/200 |
| 4,432,057 | 2/1984 | Daniell et al. | 364/300 |
| 4,468,733 | 8/1984 | Oka et al. | 364/200 |
| 4,476,524 | 10/1984 | Brown et al. | 364/200 |
| 4,484,262 | 11/1984 | Sullivan et al. | 364/200 |
| 4,488,256 | 12/1984 | Zolinwsky et al. . | |
| 4,497,023 | 1/1985 | Moorer | 395/775 |
| 4,503,497 | 3/1985 | Krygowski et al. | 364/200 |
| 4,503,535 | 3/1985 | Budde et al. | 371/11 |
| 4,510,492 | 4/1985 | Mori et al. | 370/85 |
| 4,598,400 | 7/1986 | Hillis | 370/60 |
| 4,604,694 | 8/1986 | Hough | 364/200 |
| 4,622,631 | 11/1986 | Frank et al. . | |
| 4,625,081 | 11/1986 | Lotito et al. | 379/88 |
| 4,646,271 | 2/1987 | Uchiyama et al. | 365/49 |
| 4,700,347 | 10/1987 | Rettberg et al. | 371/1 |
| 4,701,756 | 10/1987 | Burr | 370/60 |
| 4,706,080 | 11/1987 | Sincoskie | 370/94 |
| 4,714,990 | 12/1987 | Desyllas et al. | 364/200 |
| 4,730,249 | 3/1988 | O'Quin, II et al. | 364/200 |
| 4,734,907 | 3/1988 | Turner | 370/60 |
| 4,754,394 | 6/1988 | Brantley, Jr. et al. | 364/200 |
| 4,758,946 | 7/1988 | Shar et al. | 364/200 |
| 4,768,144 | 8/1988 | Winter et al. | 364/200 |
| 4,780,873 | 10/1988 | Mattheyses . | |
| 4,792,895 | 12/1988 | Tallman | 364/200 |
| 4,797,880 | 1/1989 | Bussey, Jr. et al. | 370/60 |
| 4,811,009 | 3/1989 | Orimo et al. | 370/85 |
| 4,814,970 | 3/1989 | Barbagelata et al. | 364/200 |
| 4,829,227 | 5/1989 | Turner | 370/60 |
| 4,845,702 | 7/1989 | Melindo | 370/1 |
| 4,864,495 | 9/1989 | Inaba | 364/200 |
| 4,885,742 | 12/1989 | Yano | 370/94 |
| 4,888,726 | 12/1989 | Struger et al. | 364/900 |
| 4,894,662 | 1/1990 | Counselman | 342/357 |
| 4,912,475 | 3/1990 | Conuselman, III | 342/352 |
| 4,928,224 | 5/1990 | Zulian . | |
| 4,930,106 | 5/1990 | Danilenko et al. . | |
| 4,951,193 | 8/1990 | Muramatsu et al. | 364/200 |
| 4,964,235 | 10/1990 | Hillis et al. | 370/60 |
| 4,972,338 | 11/1990 | Crawford | 364/200 |
| 4,980,816 | 12/1990 | Fukuzawa et al. | 364/200 |
| 4,984,235 | 1/1991 | Hillis et al. | 370/60 |
| 5,006,978 | 4/1991 | Neches | 364/200 |
| 5,025,365 | 6/1991 | Mathur et al. . | |
| 5,025,366 | 6/1991 | Baror | 364/200 |
| 5,055,999 | 10/1991 | Frank et al. | 364/200 |
| 5,060,186 | 10/1991 | Barbagelata et al. | 364/200 |
| 5,067,071 | 11/1991 | Schanin et al. | 395/275 |
| 5,101,402 | 3/1992 | Chiu et al. | 370/17 |
| 5,101,485 | 3/1992 | Perazzdi, Jr. | 395/400 |
| 5,119,481 | 6/1992 | Frank et al. | 395/325 |
| 5,136,717 | 8/1992 | Morley et al. | 395/800 |
| 5,212,773 | 5/1993 | Hillis | 395/200 |
| 5,226,039 | 7/1993 | Frank et al. | 370/60 |
| 5,226,109 | 7/1993 | Dawson et al. | 395/120 |
| 5,226,175 | 7/1993 | Deutsch et al. | 395/119 |
| 5,251,308 | 10/1993 | Frank et al. | 395/425 |
| 5,282,201 | 1/1994 | Frank et al. | 370/94.1 |
| 5,297,265 | 3/1994 | Frank et al. | 395/400 |

FOREIGN PATENT DOCUMENTS

| | | | |
|---|---|---|---|
| 0 229 691 | 7/1987 | European Pat. Off. . | |
| 0229932 | 7/1987 | European Pat. Off. . | |
| 0273612 | 7/1987 | European Pat. Off. . | |
| 87 30 4461 | 7/1987 | European Pat. Off. . | |
| 0233993 A | 9/1987 | European Pat. Off. . | |
| 0 278 315 | 8/1988 | European Pat. Off. . | |
| 88 31 1138 | 8/1988 | European Pat. Off. . | |
| 88 31 1139 | 8/1988 | European Pat. Off. . | |
| 0322117A | 1/1989 | European Pat. Off. . | |
| 0332818 | 1/1989 | European Pat. Off. . | |
| 90 30 6776 | 7/1990 | European Pat. Off. . | |
| 90 30 6777 | 7/1990 | European Pat. Off. . | |
| 0 404 560 | 3/1991 | European Pat. Off. | G06F 15/16 |
| 0 432 075 | 6/1991 | European Pat. Off. . | |
| 103166 | 6/1984 | Japan . | |
| 0312194 | 4/1989 | Japan . | |
| 2065941 | 7/1981 | United Kingdom . | |
| 85 19991 | 2/1985 | United Kingdom . | |
| 2178205 | 2/1987 | United Kingdom . | |
| 8808652A | 6/1988 | WIPO . | |
| 8909446 | 10/1989 | WIPO . | |
| 9000283 | 1/1990 | WIPO . | |

OTHER PUBLICATIONS

"Multi–Microprocessors: an Overview . . . ," IEEE vol. 26 #2, pp. 216–228.

"Cm*—A Modular Multi–Microprocessor," Nat'l Comp Confr '77, 637–644.

Lovett et al., Proc. '88 Int'l. Conf. on Parallel Processing, vol. 1, Penn State Univ. Press (Aug. 15–19, 1988) p. 303 et seq.

Kai Li et al., Proc. '89 Int'l. Conf. on Parallel Processing, Pen State Univ. Press (Aug. 8–12, 1989) p. I–125 et seq.

Papamarcos et al., Proc. of 11th Annual Symposium on Computer Archit. (Jun. 5–7, 1984) p. 348 et seq. (IEEE).

"High Performance/High Availability Interprocesor . . . ", IBM Tech. Disclosure Bul., vol. 31, No. 2 (Jul. 1988) pp. 41–42.

Schwartz, Telecommunications Network, "Introduction & Overview" pp. 1–20, Layered Architecture in Data networks pp. 71–117.

Haridi et al., "The Cache Coherence Protocol of the Data Diffusion Machine" Parallel Archit. Proc., vol. 1, pp. 1–18 (1989).

Warren et al., "Data Diffusion Machine—A Scalable . . . ", Proc. Int'l Conf. on Fifth . . . (1988) pp. 943–952.

Hagersten et al. "Some Issues on Cache–Only Memory Architecture," Scalable Shared–Memory Multiprocessors (May 1990) p. 12.

Hagersten et al. "The Data Diffusion Machine and its Data Coherency Protocols", Proc. of the IFIP, (1990) pp. 127–148.

Ciepielewsik et al., "A Formal Model for Or–Parallel . . . ", Proc. of the IFIP 9th World Computer Congress (1983) pp. 299–305.

Censier et al., "A New Solution to Coherence . . . ", IEEE Transaction on Computers, vol. c–27, No. 12 (Dec. 1978) pp. 1112–1118.

Eggers et al., "Evaluating the Performance of Four . . . ", Proc. of the 16th Annual Int'l Symposium on Computer Archit. (1989) pp. 2–15.

Gehringer et al., "The Cm* Hardware Architecture", Parallel Proc. the Cm* Experience, Digital Press, pp. 11–28, 432, 438.

Goodman et al., "The Wisconsin Multicube: A New . . . ", Proc. of the 15th Annual Int'l Symposium on Computer Archit. (1988) pp. 422–431.

Hagersten et al., "The Cache Coherence Protocol of the . . . ", Cache & Interconnect Archit. in Multiproc., Klewer Acad. Pub. (1990) pp. 165–188.

Mizrahi et al., "Introducing Memory into the Switch . . . ", Proc. of the 16th Annual Int'l Symposium on Computer Archit. (1989) pp. 158–166.

Pfister et al., "The IBM Research Parallel Processor . . . ", IEEE Proc. of the 1985 Int'l Conf. on Parallel Proc. (1985) pp. 764–771.

Tabak, "Chapter 8 Bus–Oriented Ssytems", Multiprocessors, Prentice Hall (1990) pp. 92–102.

Wilson, Sr. Editor, "Increased CPU Speed Drives Changes in Multiprocessor Cache and Bus Designs", Computer Design, (Jun. 1987) p. 20.

Ali et al., "Global Garbage Collection for Distributed . . . ", Int'l Jo. of Parallel Programming, vol. 15, No. 5 (1986) pp. 339–387.

SVA AND SPA FAULT CATEGORIES DEFINITIONS AND ACTIONS

| FAULT CATEGORY / PACKET FAULT FIELD | DETECTOR[1] | REQUESTOR[2] | OTHER CCUs | OTHER CIUs | OTHER[3] |
|---|---|---|---|---|---|
| MARKED FAULT (MF) - INDICATES THAT A NEW FAULT WAS DETECTED AND ISOLATED TO A SINGLE PAGE. DESC FAULT FLAG IS SET FOR SVA ACCESS ONLY. | SIGNAL FAULT, SET DESC FAULT | SIGNAL FAULT | IGNORE PKT | IGNORE PKT | INIT TO CLEAR PROPAGATED |
| UNMARKED FAULT (UMF) - INDICATES A FAULT WAS DETECTED AND THE DESCRIPTOR FAULT FLAG FOR THE PAGE(S) EFFECTED BY THE HARDWARE FAULT | SIGNAL FAULT | SIGNAL FAULT | IGNORE PKT | IGNORE PKT | INIT TO CLEAR PROPAGATED |
| DESCRIPTOR FAULT (DF) - INDICATES THAT A FAULT HAD BEEN PREVIOUSLY ISOLATED TO A CORRESPONDING PAGE | NA | SIGNAL FAULT | IGNORE PKT | IGNORE PKT | INIT TO CLEAR PROPAGATED |
| LOCAL FAULT (LF) - INDICATES THAT THE LOCAL CIU OR RIU HAS DETECTED A HARDWARE FAULT | SIGNAL FAULT | NA | NA | NA | INIT TO CLEAR CLEARED BY REV CIU |
| RRC FAULT (RRCF) - INDICATES THAT THE RRC HAS LOGGED ONE OR MORE FAULTS. | SIGNAL FAULT | PROCESS NORMALLY, SIGNAL FAULT | PROCESS NORMALLY | PROCESS NORMALLY | INIT TO CLEAR PROPAGATING |

NOTES:

1. ALWAYS SETS CORRESPONDING PACKET FAULT FIELD. THE PACKET IS OTHERWISE IGNORED (NO MEMORY SYSTEM STATE CHANGE) BY DETECTOR FOR MARKED FAULT, UNMARKED FAULT AND DESCRIPTOR FAULT. IF A RRCFAULT IS DETECTED CORRESPONDING TO THIS PACKET, QUEUE FAULT AND SIGNAL FAULT WITHIN PACKET BY ASSERTING MARKED FAULT, UNMARKED FAULT OR DESCRIPTOR FAULT.

2. IF ALSO DETECTOR, FOLLOW DETECTOR COLUMN. NO ADDITIONAL PACKET IS REQUIRED. THE PACKET IS IGNORED OTHERWISE (NO MEMORY SYSTEM STATE CHANGE) BY REQUESTOR UNLESS OTHERWISE NOTED.

3. "INIT TO CLEAR" MEANS INITIALIZE NEW PACKET FIELD TO CLEAR

*FIG. 6*

SVA AND SPA HARDWARE FAULT ITEMIZATION AND ACTIONS

| CATEGORY | SUBCATEGORY[1] | TYPE(S)[2] | ACTION[3] | NOTES |
|---|---|---|---|---|
| CACHE | DATA PARITY ERROR (PARITY ERROR IS PASSED IN RING PACKET) | SVA | MARKED FAULT | SW RECONSTRUCT FROM REDUNDANT DATA IF POSSIBLE |
| | DATA PARITY ERROR (PARITY ERROR IS PASSED IN RING PACKET) | SPA | UNMARKED FAULT | |
| | ECC, UNCORRECTABLE[4] (PARITY ERROR CORRESPONDING TO UNCORRECTABLE ECC ERROR PASSED IN PACKET) | SVA | MARKED FAULT | SW RECONSTRUCT FROM REDUNDANT DATA IF POSSIBLE |
| | ECC, UNCORRECTABLE[4] (PARITY ERROR CORRESPONDING TO UNCORRECTABLE ECC ERROR PASSED IN PACKET) | SPA | SIGNAL FAULT LOCALLY | |
| | ECC, CORRECTABLE[4] | SPA/SVA | SIGNAL FAULT LOCALLY, COMPLETE REQUEST NORMALLY | SW DECONFIGURE CELL IF CORRECTABLE ERROR RATE GREATER THAN THRESHOLD |
| | COMMAND, ADDRESS PARITY ERROR | SPA/SVA | SIGNAL FAULT LOCALLY, DELETE PACKET | THE ORIGINAL REQUESTOR WILL DETECT A TIME-OUT |
| | DESCRIPTOR W/TAG PARITY ERROR (HIT GROUP ERROR) | SVA | MARKED FAULT | |
| | DESCRIPTOR W/TAG PARITY ERROR (HIT, NON-HIT GROUP ERROR) | SVA | NO ERROR SIGNALLED | |
| | DESCRIPTOR W/TAG PARITY ERROR (HIT GROUP ERROR, NON-HIT GROUP) ER- | SVA | UNMARKED FAULT | |
| | DESCRIPTOR W/TAG PARITY ERROR (NO HIT, 1 NON-HIT GROUP ERROR) (REMOTE REQUEST) | SVA | UNMARKED FAULT[5] | |
| | DESCRIPTOR W/TAG PARITY ERROR (NO HIT, 1 NON-HIT GROUP ERROR) (REMOTE REQUEST) | SVA | UNMARKED FAULT | |

FIG. 7A

SVA AND SPA HARDWARE FAULT ITEMIZATION AND ACTIONS

| CATEGORY | SUBCATEGORY[1] | TYPE(S)[2] | ACTION[3] | NOTES |
|---|---|---|---|---|
| CACHE | DESCRIPTOR W/TAG PARITY ERROR (NO-HIT, I NON-HIT GROUP ERROR)(LOCAL REQUEST) | SVA | UNMARKED FAULT | |
| | DESCRIPTOR W/O/TAG PARITY ERROR (HIT SUM, SP_STATE[6] ERROR) | SVA | MARKED FAULT | |
| | DESCRIPTOR W/O/TAG PARITY ERROR (NON-HIT SUM, SP_STATE[6] ERROR) | SVA | MARKED FAULT | FAULT NOT INDICATED IN RING RESPONSE PACKET |
| | DESCRIPTOR MULTIMATCH WITH NO DESCRIPTOR W/TAG PARITY ERROR | SVA | UNMARKED FAULT | |
| | PRT MULTIMATCH | SPA/SVA | UNMARKED FAULT | |
| | DESC FAULT SET | SVA | DESCRIPTOR FAULT | |
| | PRT TIME-OUT | SPA/SVA | SIGNAL FAULT LOCALLY | |
| | UNEXPECTED CIU PACKET UNEXPECTED CCU PACKET | SPA | UNMARKED FAULT | |
| | UNEXPECTED CIU PACKET UNEXPECTED CCU PACKET | SVA | MARKED FAULT | |
| | INVALID INSTRUCTION OR COMMAND, SUBPAGE ALREADY ATOMIC, SUBPAGE NOT ATOMIC, PAGE NO-ATOMIC, PAGE NO-WRITE, PAGE NOT ANCHORED, MISSING PAGE, LINE FULL | SPA/SVA | SIGNAL FAULT LOCALLY | NOT HARDWARE FAULTS. NORMALLY EXPECTED SIGNALS TO SYSTEM SOFTWARE |
| | SUBCACHE DISABLE | | SEE FIG. 8 | |
| | DESC. FAULT SET AND SUBCACHE WRITEBACK OR XCACHE | SVA | DESCRIPTOR FAULT | |
| | DESC. FAULT SET AND NOT SUBCACHE AND (WRITEBACK OR XCACHE) | SVA | SEE FIG. 6 | |

*FIG. 7B*

SVA AND SPA HARDWARE FAULT ITEMIZATION AND ACTIONS

| CATEGORY | SUBCATEGORY[1] | TYPE(S)[2] | ACTION[3] | NOTES |
|---|---|---|---|---|
| CACHE | SUBCACHE WRITEBACK OR XCACHE AND (INVALID STATE, READ ONLY STATE, NONEXCLUSIVE STATE NOT SUBCACHED OR SUBCACHED DISABLED) | SVA | MARKED FAULT DESC. MODIFIED SET SUBPAGE WRITTEN | |
| | SUBCACHEWRITEBACK OR XCACHES AND PAGE MISS | SVA | MARKED FAULT DESC. MODIFIED SET AND SUBPAGE WRITTEN | |
| RING | PKT DATA PARITY ERROR (PASS) | SVA/SPA | PASS | |
| | PKT DW0-DW6 PARITY ERROR (COPY) | SPA/SVA | LOCAL FAULT, MARKED FAULT, COPY | |
| | PKT DW0-DW6 PARITY ERROR (EXTRACT) | SPA/SVA | LOCAL FAULT, MARKED FAULT, EXTRACT | |
| | PKT DW7-DW15 PARITY ERROR (COPY) | SPA/SVA | COPY | PARITY ERROR WILL BE DETECTED BY CCU |
| | PKT DW7-DW15 PARITY ERROR (EXTRACT) | SPA/SVA | EXTRACT | PARITY ERROR WILL BE DETECTED BY CCU |
| | TIMESTAMP ERROR | SPA/SVA | EXTRACT | |
| RING | FORMAT ERROR | SPA/SVA | LOCAL FAULT, EXTRACT[7] | RESTART SYSTEM WITH THE SUBRING DECONFIGURED |
| RING (CIU) | PKT COMMAND OR ADDRESS PARITY ERROR | SPA/SVA | LOCAL FAULT, EXTRACT | PACKET WILL BE DELETED BY LOCAL CACHE. |
| RING (RIU) | PKT COMMAND, ADDRESS PARITY ERROR | SPA/SVA | LOCAL FAULT, EXTRACT, DELETE PACKET | FAULT IS LOGGED. |
| CIU | RULES FAULT (INCLUDES NOMATCH), DESCRIPTOR PARITY ERROR (MATCHING GROUP), SUMMARY (MATCHING GROUP), SUBPAGE STATE (SELECTED SUBPAGE) | SVA | MARKED FAULT, LOCAL FAULT | LOCAL CACHE SETS DESC. FAULT |
| | DESCRIPTOR PARITY ERROR (NOT MATCHING GROUP) | SVA | LOCAL FAULT | |
| | DESCRIPTOR MULTIMATCH | SVA | LOCAL FAULT, UNMARKED FAULT | |

FIG. 7C

SVA AND SPA HARDWARE FAULT ITEMIZATION AND ACTIONS

| CATEGORY | SUBCATEGORY[1] | TYPE(S)[2] | ACTION[3] | NOTES |
|---|---|---|---|---|
| RDU | DIRECTORY CORRECTABLE | SVA | LOG ERROR | |
| | DIRECTORY UNCORRECTABLE | SVA | RRC FAULT, LOG FAULT | |
| | RULES FAULT | SVA | RRC FAULT, LOG FAULT | |
| IBU | INTER RING LINK REJECT OR TIME-OUT RECOVERY | SVA/SPA | LOG ERROR, RETRANSMIT PKT | |
| | INTER RING LINK FAILURE (UNSUCCESSFUL TIME-OUT RECOVERY) | SVA/SPA | LOG ERROR | QUEUE RE-INITIALIZED BY SOFTWARE |
| PROCESSOR | WATCHDOG TIMER | NA | ASSERT CELL RESET | CCU SETS SUBCACHE DISABLE |
| | DOUBLE TRAP RESET | NA | ASSERT CELL RESET | CCU SETS SUBCACHE DISABLE |
| SUBCACHE | DATA PARITY ERROR, INSTRUCTION PARITY ERROR | ALL CYCLES | ASSERT CELL RESET | EXECUTION UNITS RECORD PARITY ERROR. CCU SETS SUBCACHE DIS. |
| | INSTR SUBCACHE TAG PARITY ERROR, INSTR SUBCACHE STATE PARITY ERR, INSTR SUBCACHE MULTIPLE MATCH | ALL NON-ROM FETCH CYCLES[8] | ASSERT CELL RESET | CEU RECORDS THE ERROR. CCU SETS SUBCACHE DIS |
| | DATA SUBCACHE TAG PARITY ERROR, DATA SUBCACHE STATE PARITY ERR, DATA SUBCACHE MULTIPLE MATCH | MEMORY REF. CLASS OR MEMORY CONTROL CLASS | ASSERT CELL RESET | CEU RECORDS PARITY ERROR. CCU SETS SUBCACHE DIS. |

1 MATCHING GROUP PARITY ERROR IS DETECTED BY NO MATCH AND DESCRIPTOR PARITY ERROR.

2 THE FOLLOWING INSTRUCTIONS GENERATE SPA TYPE PACKETS: MSPAR, AND MSPAW. MEMORY REGISTERS (lm0-lm3) ARE ACCESSED BY MRR AND MRW INSTRUCTION. ALL OTHER INSTRUCTIONS GENERATE SVA TYPE PACKETS. MRR AND MRW INSTRUCTIONS NEVER SIGNAL ERRORS.

3 ALL EXTRACTED PACKETS ARE SHORTENED. ALL LOCAL FAULT PACKETS ARE SHORTENED.

4 ALL SVA AND SPA PACKETS (EXCEPT ST64) WHICH MOVE DATA TO OR FROM THE LOCAL CACHE MUST CHECK ECC AND SIGNAL ERRORS. OTHER SVA AND SPA PACKETS OPTIONALLY CHECK AND SIGNAL ECC ERRORS.

5 CURRENT IMPLEMENTATION IS UNMARKED FAULT. PREFERRED IMPLEMENTATION IS MARKED FAULT.

6 INCLUDES 1 SUMMARY 1, 1 SUMMARY 2, AND 1 SUBPAGE STATE FIELD REFERENCE BY REQUEST.

7 EXTRACT AND SIGNAL LOCAL FAULT FOR FIRST PACKET WITH FORMAT ERROR DETECTED

8 EXCLUDES INSERTED INSTRUCTIONS

*FIG. 7D*

SUBCACHE DISABLE ACTIONS

| SUBPAGE STATE | SUB CACHED | DESC. NO_WRITE | DESC. FAULT | SUBCACHE DISABLE | NEW FAULT | ACTION |
|---|---|---|---|---|---|---|
| X | X | X | SET | X | X | SIGNAL DESCRIPTOR FAULT |
| X | X | X | CLEAR | CLEAR | YES | SIGNAL MARKED FAULT OR UNMARKED FAULT |
| | | | CLEAR | CLEAR | NO | NORMAL ACTION |
| | | | | | | |
| INVALID, READ ONLY NON-EX | CLEAR | X | CLEAR | SET | X | NORMAL ACTION |
| INVALID, READ ONLY NON-EX | SET | X | CLEAR | SET | X | TREAT AS IF SUBCACHED CLEAR |
| ≥ EX | CLEAR | X | CLEAR | SET | X | NORMAL ACTION |
| ≥ EX | SET | CLEAR | CLEAR | SET | X | SIGNAL DESCRIPTOR FAULT |
| ≥ EX | SET | SET | CLEAR | SET | X | TREAT AS IF SUBCACHED CLEAR |

*FIG. 8*

FAULT CONTAINMENT SYSTEM FOR MULTIPROCESSOR WITH SHARED MEMORY

REFERENCE TO RELATED APPLICATIONS

This is a Continuation of commonly assigned U.S. patent application Ser. No. 07/763,677 filed on Sept. 23, 1991 Entitled: FAULT CONTAINMENT SYSTEM FOR MULTIPROCESSOR WITH SHARED MEMORY, from abandoned, which application is a continuation in part of the following and commonly assigned applications, the teachings of which are incorporated herein by reference:

1) U.S. patent application Ser. No. 07/136,930, filed Dec. 22, 1987, for "MULTIPROCESSOR DIGITAL DATA PROCESSING SYSTEM," now U.S. Pat. No. 5,055,999, issued Oct. 8, 1991;

2) U.S. patent application Ser. No. 07/696,291, filed May 20, 1991 for INTERCONNECTION SYSTEM FOR MULTIPROCESSOR STRUCTURE," now U.S. Pat. No. 5,119, 481, issued Jun. 2, 1992;

3) U.S. patent application No. 07/370,325, filed Jun. 22, 1989, for "MULTIPROCESSOR SYSTEM WITH MULTIPLE INSTRUCTION SOURCES," abandoned in favor of U.S. patent application Ser. No. 08/066,334, filed, May 21, 1993, abandoned in favor of U.S. patent application Ser. No. 08/461,166, filed Jun. 5, 1995;

4) U.S. patent application No. 07/370,341, filed Jun. 22, 1989, for "IMPROVED MEMORY SYSTEM FOR A MULTIPROCESSOR," now U.S. Pat. No. 5,297,265, issued Mar. 22, 1994;

5) U.S. patent application No. 07/370,287, filed Jun. 22, 1989, for "IMPROVED MULTIPROCESSOR SYSTEM," now U.S. Pat. No. 5,251,308, issued Oct. 5, 1993;

6) U.S. patent application No. 07/499,182, filed Mar. 26, 1990, for "HIGH-SPEED PACKET SWITCHING APPARATUS AND METHOD," now U.S. Pat. No. 5,335,325, issued Aug. 2, 1994;

7) U.S. patent application No. 07/521,798, filed May 10, 1990, for "DYNAMIC PACKET ROUTING NETWORK," now U.S. Pat. No. 5,282,201, issued Jan. 25, 1994;

8) U.S. patent application No. 07/526,396, filed May 18, 1990, for "PACKET ROUTING SWITCH," now U.S. Pat. No. 5,226,039, issued Jul. 6, 1993;

9) U.S. patent application No. 07/531,506, filed May 31, 1990, for "DYNAMIC HIERARCHICAL ASSOCIATIVE MEMORY," now U.S. Pat. No. 5,341,483, issued Aug. 23, 1994;

This application is related to the following co-pending and commonly assigned applications, the teachings of which are incorporated herein by reference:

10) U.S. patent application Ser. No. 07/763,368, for DIGITAL DATA PROCESSOR WITH IMPROVED PAGING, filed Sept. 20, 1991, now abandoned in favor of U.S. patent application Ser. No. 08/461,174, filed Jun. 5, 1995;

11) U.S. patent application Ser. No. 07/763,505, for DIGITAL DATA PROCESSOR WITH IMPROVED CHECKPOINTING & FORKING, filed Sept. 20, 1991, now U.S. Pat. No. 5,313,647 issued May 17, 1994;

12) U.S. patent application Ser. No. 07/763,132, for IMPROVED DIGITAL DATA PROCESSOR WITH DISTRIBUTED MEMORY SYSTEM, filed Sept. 20,1991, now abandoned in favor of U.S. patent application Ser. No. 461,167, filed Jun. 5, 1995;

13) U.S. patent application Ser. No. 07/763,507, for PARALLEL PROCESSING APPARATUS AND METHOD UTILIZING TILING, filed Sept. 20,1991, abandoned in favor of U.S. patent application Ser. No. 08/461,178, filed Jun. 5, 1995, now U.S. Pat. No. 5,535,393.

BACKGROUND

This invention relates to digital data storage and accessing and, more particularly, to the detection and containment of faults in distributed memory systems.

Simple computing systems rely on a main memory bank to store data available for processing. When the central processing unit, or CPU, issues a request to read or write a datum, a copy transferred from main memory to a smaller, cache memory associated with the CPU. The datum, if updated by the CPU, is later transferred back from the cache memory to the main memory.

Error detection in simple such systems is limited to checking the parity of the datum during its transfer between the main and cache memories. In the event of a parity error, the computer system can alert the operator, then halt operation, preventing further processing of potentially flawed data.

More complex systems incorporate error checking and correction (ECC) codes within each data word. These codes effectively represent the parity of respective overlapping subsets of bits within a data word. Through these codes, the systems can not only detect data errors, but can also correct certain ones of them, e.g., errors involving a single erroneous bit.

In systems employing ECC codes, simple errors are typically corrected and logged as the requested datum is routed to its destination. Complex transmission errors may require regeneration of the faulty datum. Where a stored datum itself is faulty, the system may mark that datum to prevent further access.

Error detection becomes more complicated in computer systems which employ distributed memory, i.e., a plurality of distinct memory elements storing data from one or more processors. An example of such a system is disclosed by Frank et al, U.S. patent application Ser. No. 136,930, filed Dec. 22, 1987, now U.S. Pat. No. 5,055,999.

Within the Frank et al system, there a digital data processing system is said to comprise a plurality of processing cells arranged in a hierarchy of rings. The processing cells include central processing units coupled with memory elements. Groups of cells are interconnected along unidirectional bus rings to form units referred to as segments. Communications between cells of different domain(0) segments are carried out on higher level information transfer domains. These higher level domains are themselves made up of one or more segments, each comprising a plurality of routing elements coupled via a unidirectional bus ring.

A system of the type described by Frank et al does not require a main memory element, i.e., a memory element coupled to and shared by the system's many processors. Rather, data maintained by the system is distributed, both on exclusive and shared bases, among the memory elements associated with those processors. Modifications to datum stored exclusively in any one processing cell do not have to be communicated along the bus structure to other storage areas. Accordingly, only that data which the processors dynamically share, e.g., sharing required by the executing program themselves, must be transmitted along the bus structure.

Those skilled in the art will appreciate the difficulties inherent to fault detection and containment in a distributed, shared memory system of the type described by Frank et al. When, for example, a first CPU accesses a faulty datum, that CPU must detect the fault, process it and, ultimately, try to correct it. Before it is corrected, however, a second CPU may access the faulty datum and use it to generate other data which, too, are likely to be erroneous. In this manner, the initial fault can propagate throughout the system before it is detected and properly handled.

In view of the foregoing, an object of this invention is to provide improved an mechanism for fault detection and containment within a distributed memory system.

Another object is to provide means for limiting the propagation of erroneous data within such systems.

A still further object is provide a ready mechanism for identifying the source of error.

SUMMARY OF THE INVENTION

The above objects are attained by the invention, which provides in one aspect an improved multiprocessor system of the type having a plurality of processors coupled via a network to a memory element. The memory responds to at least a selected datum request generated by a processor for accessing that datum and, absent fault, transmitting it in a response packet to at least to the requesting processor. A fault containment element responds to at least certain faults during access or transmission of the datum for including within the response packet a fault signal that prevents the requester from accessing the datum.

At least one processor, other than the requester, can store status information for one or more data. Such a processor normally responds to at least selected response packets carried on the network for updating the status with respect to data contained packets passing on the network. In the case of packets that include the fault signal, however, the fault containment element prevents that other processing cell from updating the corresponding status information.

Each processor of the above-described multiprocessor system may be associated with a respective memory element, such that each processor and its associated memory is referred to as a processing cell. A subcache within a processing cell temporarily stores data being currently accessed by the processor. The associated memory element includes a cache memory and controller coupled to that cache and to the subcache.

In the absence of fault, the controller accesses in the cache at least selected data requested by the associated central processing unit, transferring that data to the subcache. A subcache disable element is responsive to at least selected faults in operation of the cache or subcache for preventing the transfer of data therebetween.

According to still another aspect of the invention, each of at least selected data are associated with descriptors by which those data are referenced. The memory elements include functionality for modifying the descriptor associated with a particular datum in the event of selected fault in that datum.

The fault-detection element of a multiprocessor apparatus as described above can include a marking element for incorporating into the response packet a signal representing a specific fault condition, if any, detected in connection with responding the access request.

For example, in response to a selected fault condition isolated to a datum not previously detected as faulty, the marking element can include a "marked fault" signal in the response packet. Whereas, it can include an "unmarked fault" signal in response to a selected fault condition associated with a requested datum, but not specifically isolated to that datum.

In instances where a request is made for a datum which had previously been detected as faulty, the marking element can include in the response packet a "descriptor fault" signal. This is a significant feature in that it can facilitate identification of a particular source of an error and prevent that error from propagating to other processing cells.

Thus, for example, if multiple processors request access to a faulty datum, only the earliest one of those requesters will be signaled with the "marked fault" signal. The rest will be signaled with the "descriptor fault" signal. By tracking that information, the system software can more readily locate the probable cause of the error.

Per the aforementioned aspect, the fault detection element can determine whether a requested datum had previously been detected as faulty by reference to a fault flag associated with that datum. That fault flag can be set, for example, in connection with generation of the marked fault signal discussed above.

According to another aspect of the invention, the network element can include a bus for carrying packets and a plurality of control elements coupled between respective ones of the memories and the bus for selectively transferring packets therebetween. The marking element can respond to a fault in connection with the transfer of packets by the control elements for including in the response packet a "local fault" signal.

In still another aspect of the invention, the bus can include a plurality of segments, with routing elements coupled between respective pairs of the segments for selectively transferring packets therebetween. The marking element can respond to a fault in connection with the transfer of a packet by one of those routing elements for including in the packet a remote fault signal.

Each datum stored by the memory elements of a multiprocessor system constructed in accordance with the invention can be associated with an address by which that datum is referenced. The addresses associated with the data stored in the plurality of memory elements comprise a single virtual address space. The processors of that system generate the access requests specifying the address associated with each requested datum, and the memory elements respond to the specified addresses for accessing the requested datum.

These and other aspects of the invention are evident in the drawings which are attached and in the detailed description which follows.

BRIEF DESCRIPTION OF THE DRAWINGS

A fuller understanding of the invention may be attained by reference to the drawings, in Which:

FIG. 6 overviews the fault categories detected by a multiprocessor system according to the invention, and the actions taken as a result of those faults;

FIGS. 7A through 7D more completely detail the faults handled by such a multiprocessor system and the actions it takes in response thereto; and FIG. 8 specifies SubCacheDisable actions taken by the processing cells of the illustrated multiprocessing system.

DETAILED DESCRIPTION OF THE ILLUSTRATED EMBODIMENT

Figure 1:
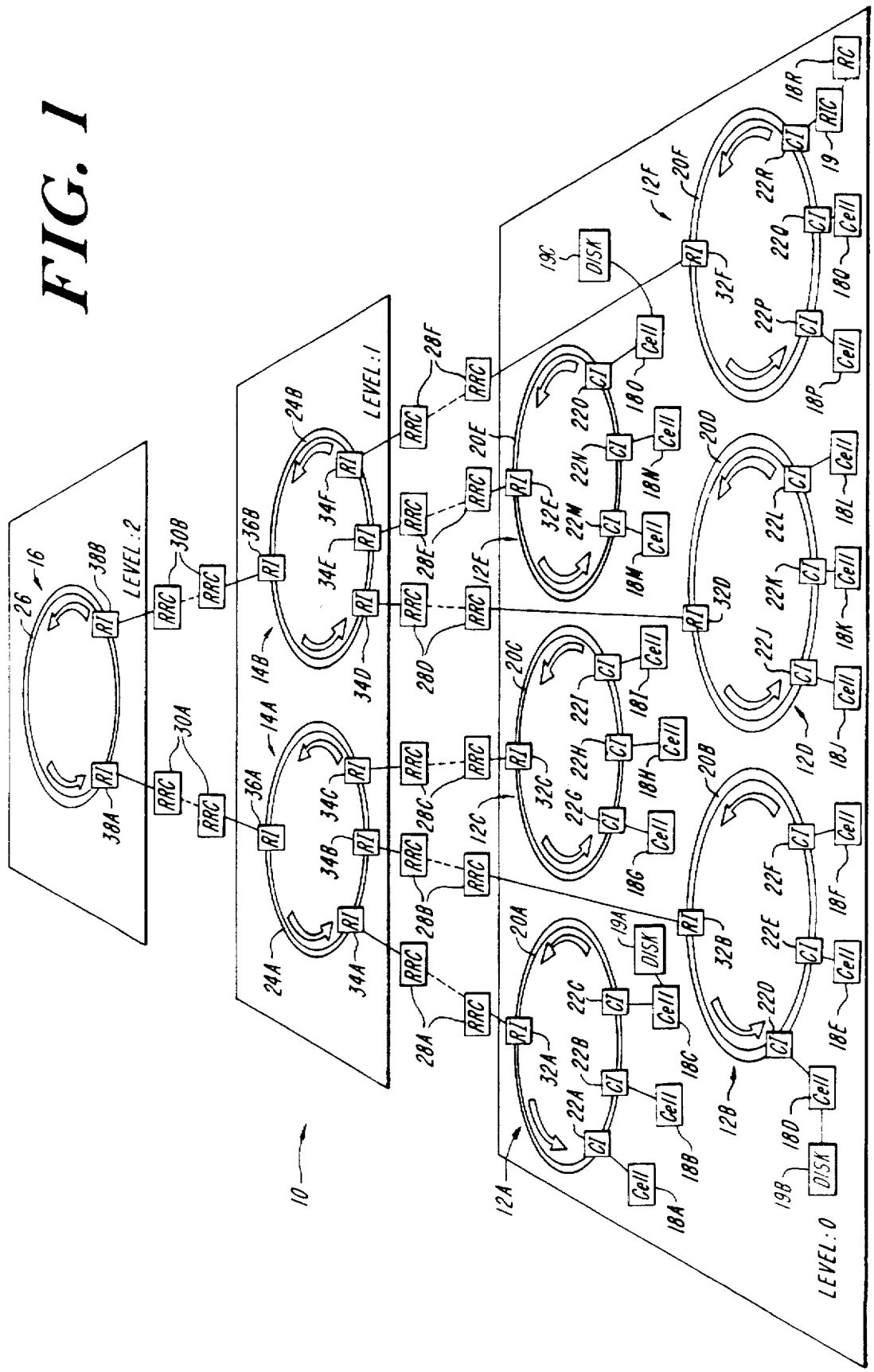
FIG. 1 depicts the structure of a multiprocessing system for use in a preferred practice of the invention.

FIG. 1 depicts a preferred multiprocessing system used to practice the invention. The illustrated system 10 includes three information transfer levels: level:0, level:1, and level:2. Each information transfer level includes one or more level segments, characterized by a bus element and a plurality of interface elements. Particularly, level:0 of the illustrated system 10 includes six segments, designated 12A, 12B, 12C, 12D, 12E and 12F, respectively. Similarly, level:1 includes segments 14A and 14B, while level:2 includes segment 16.

Each segment of level:0, i.e., segments 12A, 12B, ... 12F, comprise a plurality of processing cells. For example, segment 12A includes cells 18A, 18B and 18C; segment 12B includes cells 18D, 18E and 18F; and so forth. Each of those cells include a central processing unit and a memory element, interconnected along an intracellular processor bus (not shown). In accordance with the preferred practice of the invention, the memory element contained in each cells stores all control and data signals used by its associated central processing unit.

Certain cells of the processing system 10 are connected to secondary storage devices. In the illustrated system, for example, cell 18C is coupled with disk drive 19A, cell 18D is coupled with disk drive 19B, and cell 18O is coupled with disk drive 19C. The disk drives 19A–19C are of conventional design and can be selected from any of several commercially available devices. It will be appreciated that secondary storage devices other than disk drives, e.g., tape drives, can also be used to store information.

As further illustrated, each level:0 segment may be characterized as having a bus element providing a communication pathway for transferring information packets between the cells of the segment. Thus, illustrated segment 12A is characterized by bus 20A, segment 12B by 20B, segment 12C by 20C, et cetera. As described in greater detail below, digital information packets are passed between the cells 18A, 18B and 18C of exemplary segment 12A by way of the memory elements associated with each of those cells. Specific interfaces between those memory elements and the bus 20A are provided by cell interface units 22A, 22B and 22C, as shown. Similar direct communication pathways are established in segments 12B, 12C and 12D between their respective cells 18D, 18E ... 18R by cell interface units 22D, 22E, ... 22R, as illustrated.

As shown in the illustration and noted above, the remaining information transfer levels, i.e., level:1 and level:2, each include one or more corresponding level segments. The number of segments in each successive segment being less than the number of segments in the prior one. Thus, level:1's two segments 14A and 14B number fewer than level:0's six 12A, 12B ... 12F, while level:2, having only segment 16, includes the fewest of all. Each of the segments in level:1 and level:2, the "higher" levels, include a bus element for transferring packets within the respective segments. In the illustration, level:1 segments 14A and 14B include bus elements 24A and 24B, respectively, while level:2 segment 16 includes bus element 26.

The routing cells themselves provide a mechanism for transferring information between associated segments of successive levels. Routing cells 28A, 28B and 28C, for example, provide a means for transferring information to and from level:1 segment 14A and each of level:0 segments 12A, 12B and 12C, respectively. Similarly, routing cells 28D, 28E and 28F provide a means for transferring information to and from level:1 segment 14B and each of level:0 segments 12D, 12E and 12F, respectively. Further, routing cells 30A and 30B provide an information transfer pathway between level:2 segment 16 and level:1 segments 14A and 14B, as shown.

The routing cells interface their respective segments via interconnections at the bus elements. Thus, routing cell 28A interfaces bus elements 20A and 24A at ring interconnects 32A and 34A, respectively, while element 28B interfaces bus elements 20B and 24B at ring interconnects 32B and 34B, respectively, and so forth. Similarly, routing cells 30A and 30B interface their respective buses, i.e., 24A, 24B and 26, at ring interconnects 36A, 36B, 38A and 38B, as shown.

Data Movement & Coherency

Figure 2A:
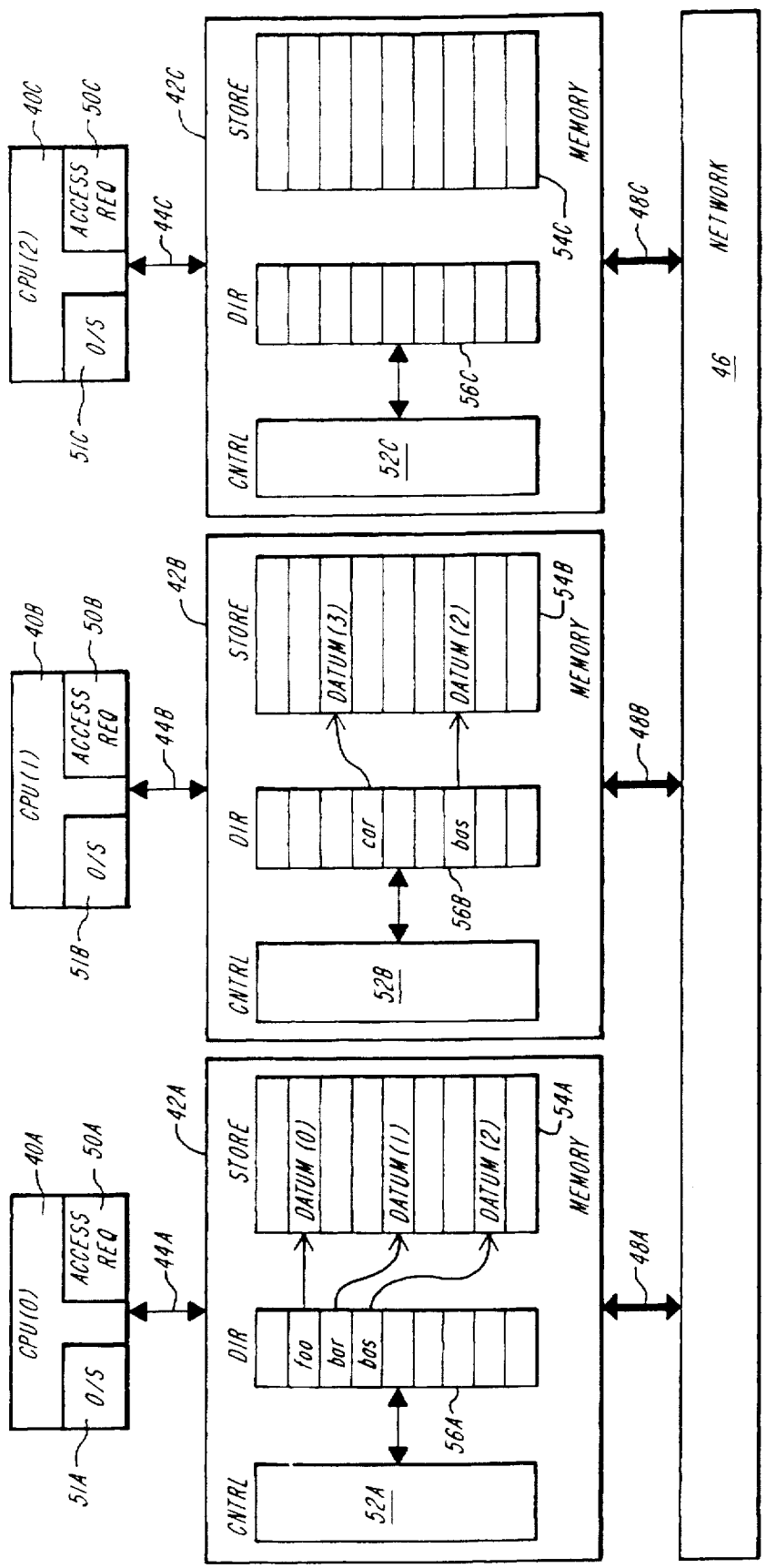
FIGS. 2A–2B depict a preferred memory configuration and data management operation for the multiprocessor of FIG. 1.

FIG. 2A illustrates a mechanism for data movement within the processing system of FIG. 1 for insuring data coherence. In the drawing, plural central processing units 40(A), 40(B) and 40(C) are coupled, respectively, to associated memory elements 42(A), 42(B) and 42(C). Communications between the processing and memory units of each pair are carried along buses 44A, 44B and 44C, as shown. Network 46, representing the aforementioned level segments and routing cells, transfers information packets (passed to the network 46 over buses 48(A), 48(B) and 48(C)) between the illustrated processing cells 42A–42C.

In the illustrated embodiment, the central processing units 40A, 40B and 40C each include an access request element, labeled 50A, 50B and 50C, respectively. These access request elements generate requests for access to data stored in the memory elements 42A, 42B and 42C. Among access requests signals generated by elements 50A, 50B and 50C is the ownership-request, representing a request for exclusive, modification access to a datum stored in the memory elements. In a preferred embodiment, access request elements 50A, 50B and 50C comprise a subset of an instruction set implemented on CPU's 40A, 40B and 40C. This instruction subset is described below.

The central processing units 40A, 40B, 40C operate under control of an operating system 51, portions 51A, 51B and 51C of which are resident on respective ones of the central processing units. The operating system 51 provides an interface between applications programs executing on the central processing units and the system 10 facilities, and includes a virtual memory management system for managing data accesses and allocations.

A preferred operating system for controlling central processing units 40A, 40B and 40C is a UNIX-like operating system and, more preferably, OSF/1 1.0, modified in accordance with the teachings herein.

The memory elements 40A, 40B and 40C include cache control units 52A, 52B and 52C, respectively. Each of these cache control units interfaces a data storage area 54A, 54B and 54C via a corresponding directory element 56A, 56B and 56C, as shown. Stores 54A, 54B and 54C are utilized by the illustrated system to provide physical storage space for data and instruction signals needed by their respective central processing units. Thus, store 54A, maintains data and control information used by CPU 40A, while stores 54B and 54C maintain information used by central processing units 40B and 40C, respectively. The data maintained in each of the stores are identified by unique descriptors corresponding to system addresses. Those descriptors are stored in address storage locations of the corresponding directory. While the descriptors are considered unique, multiple copies of some descriptors may exist among the memory elements 42A, 42B and 42C where those copies themselves identify copies of the same data element.

Access requests generated by the central processing units 40A, 40B and 40C include, along with other control information, a descriptor or SVA ("system virtual address") request portion matching that of the requested datum. The cache control units 52A, 52B and 52C respond to access requests generated their respective central processing units 40A, 40B and 40C by determining whether the requested datum is stored in the corresponding storage element 54A, 54B and 54C. If so, that item of information is transferred for use by the requesting processor. If not, the cache unit 52A, 52B, 52C transmits a packet including the request to the network 46 along lines 48A, 48B and 48C.

As that packet travels within the networks and, particularly, along the ring:0 segments, cache control units within the processing cells check their own directories, passing the requested data, if found, in a response packet. Likewise the local routing element checks its directory. If that directory shows that the requested data is present in local ring in the proper access state, the routing cell permits the request packet to continue along the local ring bus. If not, the routing cell extracts the packet and passes to the associated level:1 segment.

The unresolved request packet travels along the level:1 segment in a similar fashion, i.e., it is compared with the directories of the associated level:1 routing cells. If one of those directories lists the requested data in the proper access state in a descendant level:0 segment, the request is passed to that segment. Otherwise, the request packet may pass to a higher level, if any, in the hierarchy or be returned to the requester unresolved.

Packets containing requested data are routed back to requesting cells by differing mechanisms. A first mechanism relies on the address, or ID, of the requesting cell. Here, each requesting cell includes within its request packet an ID uniquely identifying that cell. Once that packet reaches the responding cell, that cell copies the requestor-ID, along with the datum and corresponding descriptor, into the response packet. As the response packet travels along the segments rings, the routing cells examine the requestor-ID to determine whether the requesting cell is in a descendant or parent segment and route the packet accordingly.

A second mechanism is used in conjunction with response packets that include data requested by processing cells but not specifically generated in response to those requests. By way of example, the mechanism applies in instances where two or more requesting cells generate requests for read-only copies to a specific datum held in a remote cell.

Presuming, in accordance with one preferred practice of the invention, that the network prevents at least some, but not all, of those requests from reaching a processing cell having a copy of that datum, the responding cell generates response packets bearing only the requestor-ID of a request packet that reached it.

Data coherency is maintained by cooperative action of the processing cells in response to data requests and transfers. More particularly, concurrent with generation of an ownership-access request packet by a first processing cell, the associated memory allocates in its store physical space to hold the requested data. Likewise, concurrent with the transfer of a requested datum from the processing cell in which it was previously stored, the associated memory deallocates physical storage space which had been previously allocated for storage of the requested datum.

Figure 2B:
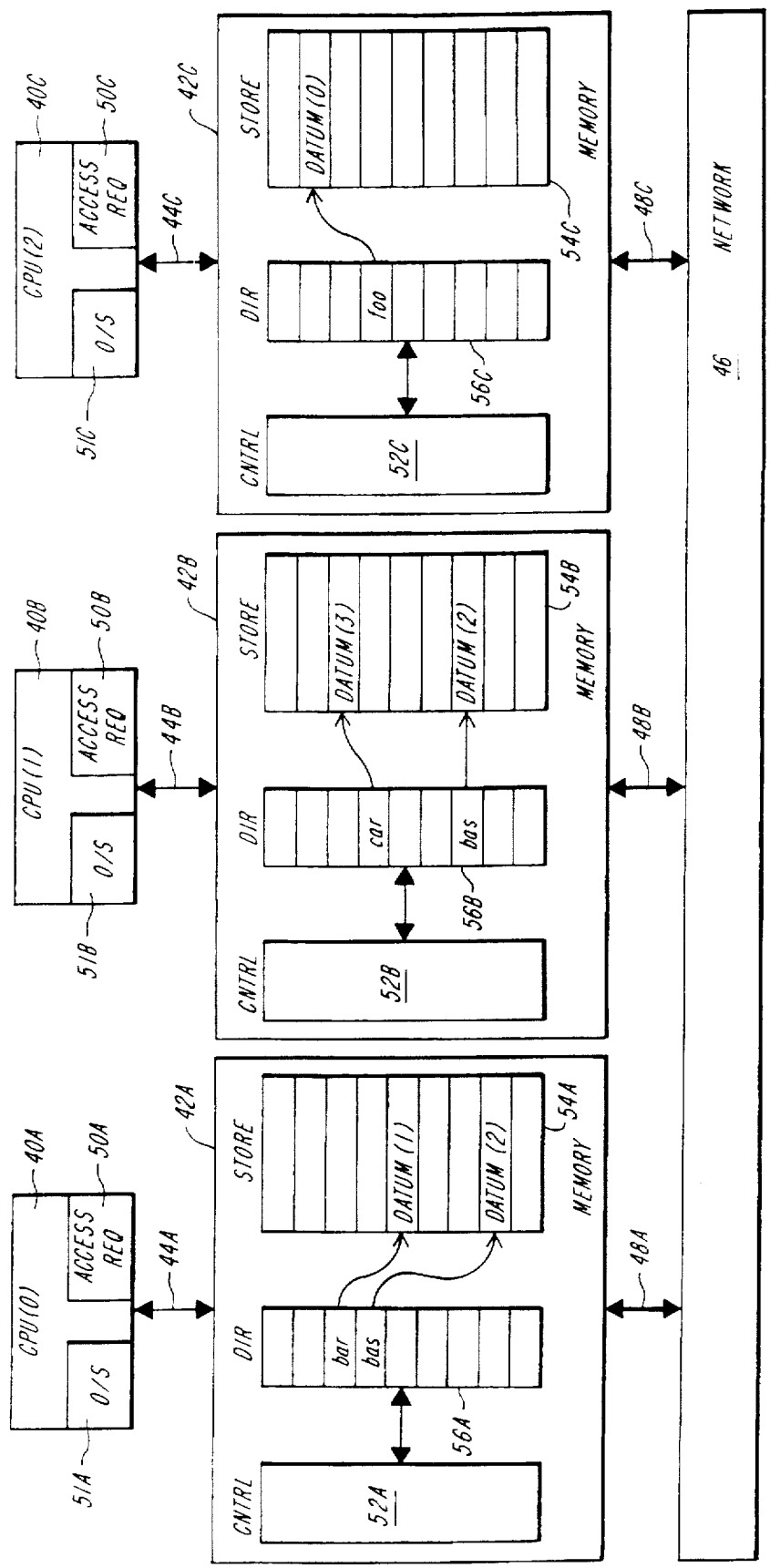

These cooperative actions are illustrated in FIGS. 2A and 2B. In the first of those drawings, DATUM(0), DATUM(1) and DATUM(2), representing data subpages, are retained in the store of the memory element 42A partnered with CPU 40A. Descriptors "foo," "bar" and "bas" which correspond, respectively, to those data stored in directory 56A. Each such descriptor includes a pointer indicating the location of its associated information signal in the store 42A.

The memory element 42B partnered to CPU 40B stores DATUM(2) and DATUM(3), which also represents a data subpage. Corresponding to each of those data elements are descriptors "car" and "bas," retained in directory 56B. DATUM(2), and its descriptor "bas," are copied from store 42A and, therefore, retain the same labels.

The system illustrated in FIG. 2A does not store any data in the memory element 54C partnered to CPU 40C.

FIG. 2B illustrates how a datum moves in conjunction with an ownership for it by processing cell which does not already have access to that datum. In particular, the illustration depicts the movement of DATUM(0) following issuance of an unresolved request for ownership for it by the processing cell made up of CPU 40C and memory 42C. At the outset, concurrent with the request, the cache control unit 52C allocates physical storage space in the store 54C of memory element 42C.

A response packet generated by memory 42A transfers the requested data, DATUM(0), from store 54A, where it had previously been stored, to the requestor's store 54C. Concurrently the cache control unit 52A deallocates that space in store 54A which had previously held the requested datum. At the same time, the cache control unit 52A effects invalidation of the descriptor "foo" in directory 56A (where it had previously been used to identify DATUM(0) in store 54A), while cache control unit 52C reallocates that same descriptor in directory 56C, where it will subsequently be used to identify the signal in store 54C.

In addition to descriptors, the memory elements 42A–42C assign access state information to the data and control signals in their respective stores. These access states, which include the invalid, read-only, ownership and atomic states, govern the manner in which data may be accessed by specific processors. A datum which is stored in a memory element whose associated CPU maintains modification access over that datum is assigned an ownership state. While, a datum which is stored in a memory element whose associated CPU does not maintain priority access over that datum is assigned a read-only state. Further, a purported datum which associated with "bad" data is assigned the invalid state.

A further appreciation of preferred structures (e.g., cache control units and ring routing cells) for data movement and memory coherence in a digital data processing system constructed in accordance with the invention may be had by reference to the above-cited related applications, e.g., U.S. patent application Ser. No. 136,930, filed Dec. 22, 1987, now U.S. Pat. No. 5,055,999, U.S. patent application Ser. No. 370,287, filed Jun. 22, 1989, now U.S. Pat. No. 5,282,201, U.S. patent application Ser. No. 521,798, filed May 10, 1990, now U.S. Pat. No. 5,282,201, and U.S. patent application Ser. No. 531,506, filed May 31, 1990, now U.S. Pat. No. 5,341,483.

Segment Bus

Figure 3:
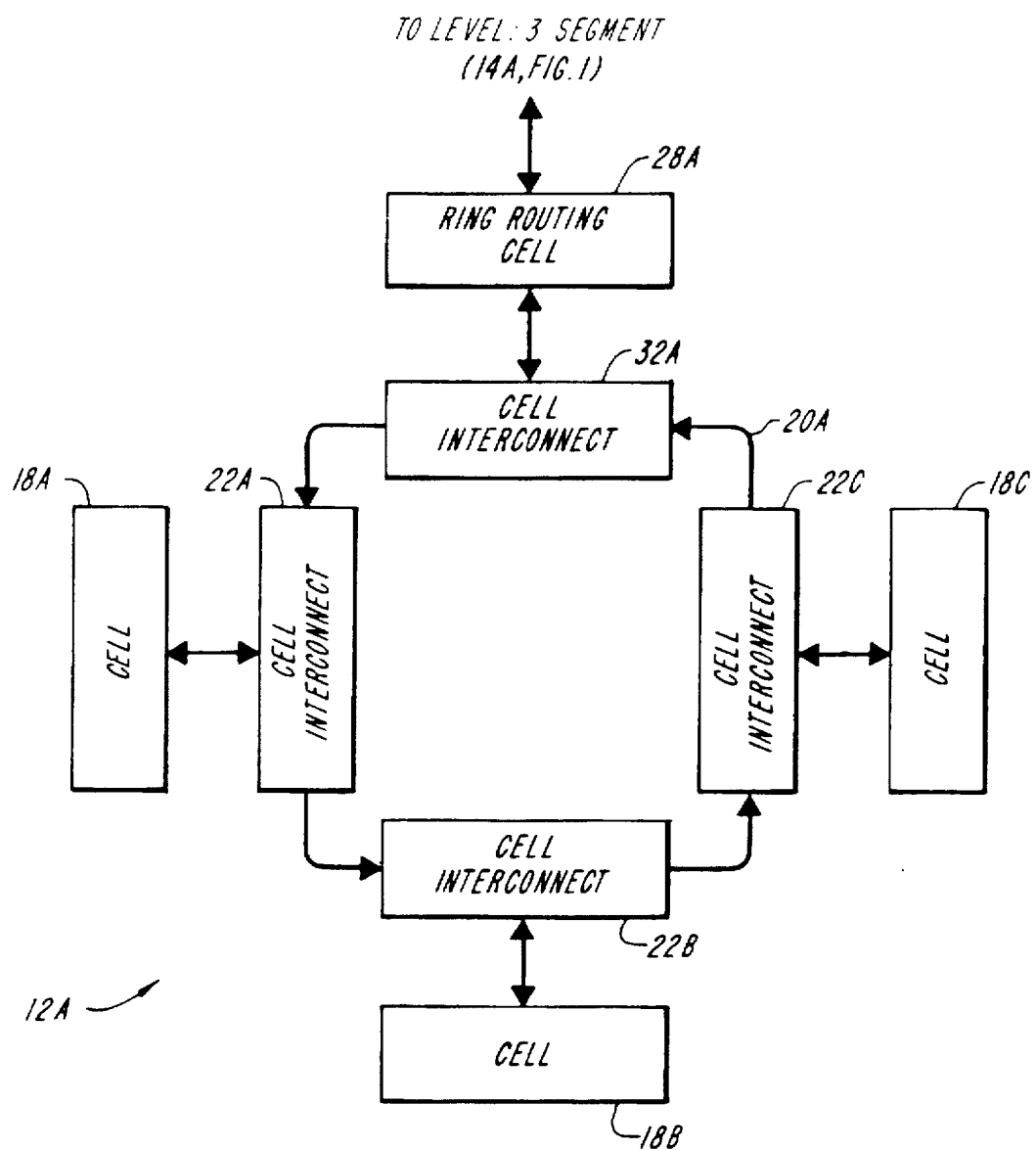
FIG. 3 depicts a preferred configuration for an exemplary level:0 segment of the multiprocessing system of FIG. 1.

FIG. 3 depicts a preferred configuration for exemplary level:0 segment 12A of FIG. 1. The segment 12A includes processing cells 18A, 18B and 18C interconnected by cell interconnects 22A, 22B and 22c along bus segment 20A. Routing unit 28A provides an interconnection between the level:0 segment 12A and if parent, level:1 segment 14a of FIG. 1. This routing unit 28A is coupled along bus 20A by way of cell interconnect 32A, as shown. The structure of illustrated bus segment 20A, as well as its interrelationship with cell interconnects 22A, 22B, 22C and 32A, may be fully appreciated by reference to the above-cited related applications, e.g., U.S. patent application Ser. No. 696,291, now U.S. Pat. No. 5,119,481.

Processing Cell

Figure 4:
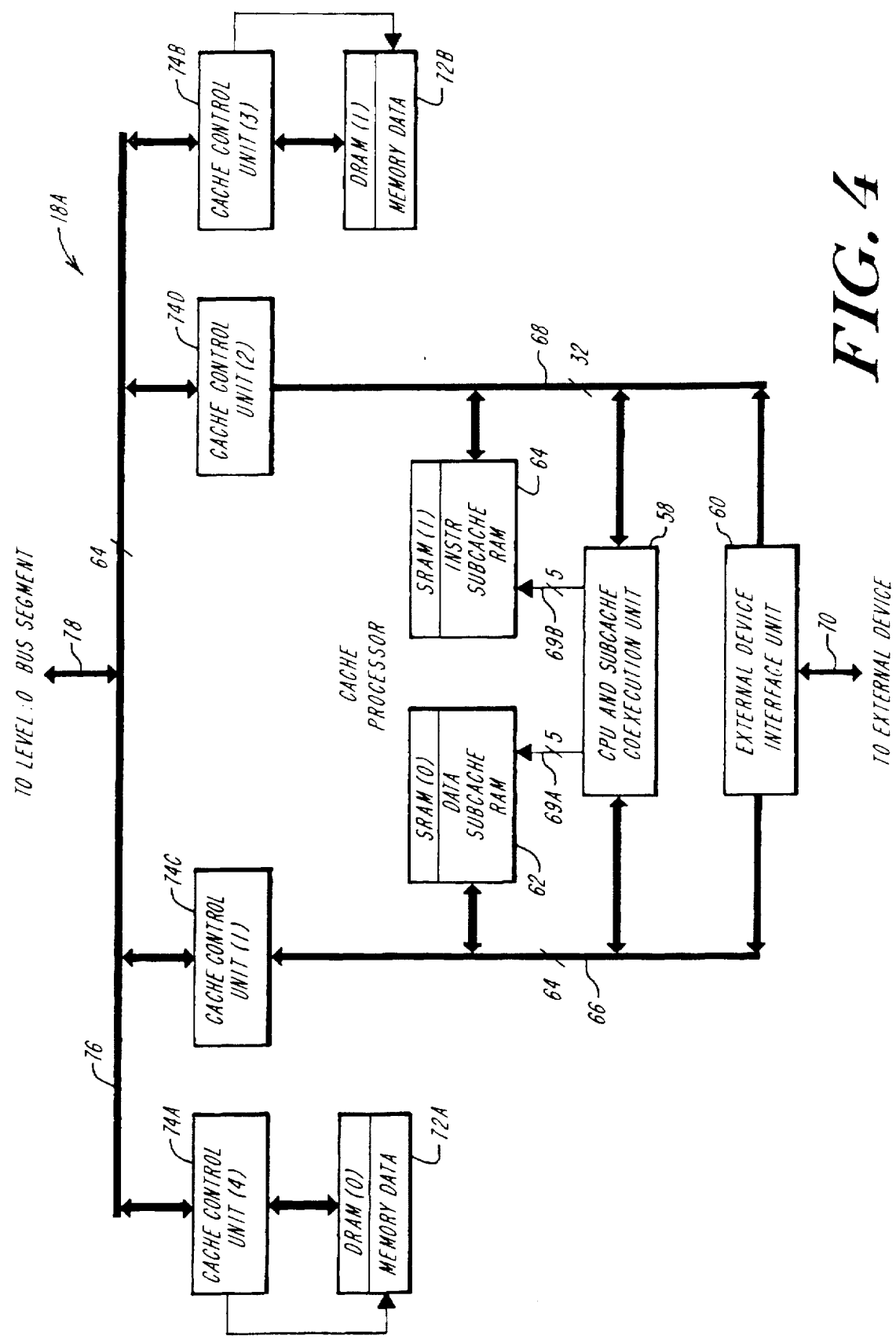
FIG. 4 depicts a preferred stricture for processing cells of the multiprocessing system of FIG. 1.

FIG. 4 depicts a preferred structure for an exemplary processing cell 18A of the illustrated embodiment. The illustrated processing cell 18A includes a central processing unit 58 coupled with external device interface 60, data subcache 62 and instruction subcache 64 over processor bus 66 and instruction bus 68, respectively.

Interface 60 provides communications with an external device, e.g., disk drive 19A, over external device bus 70, in a manner conventional to the art.

A more complete understanding of the circuitry illustrated in this drawing may be attained by reference to the above-cited related patent applications, e.g., U.S. patent application Ser. No. 136,930, filed Dec. 22, 1987, now U.S. Pat. No. 5,055,999; U.S. patent application Ser. No. 370,325, filed Jun. 22, 1989, which was abandoned in favor of U.S. patent application Ser. No. 066,334, filed May 21, 1993, which was abandoned in favor of U.S. patent application Ser. No. 461,166, filed Jun. 5, 1995; and U.S. patent application Ser. No. 499,182, filed Mar. 26, 1990, now U.S. Pat. No. 5,335,325.

The Memory System

As discussed above, a multiprocessing system 10 constructed in accordance with a preferred embodiment of the invention permits access to individual data elements allocated to processing cells 18A, 18B, ... 18R by reference to a unique descriptor, based on a system virtual address (SVA), associated with each datum. In the illustrated system 10, implementation of this capability is provided by the combined actions of the processing cell memory units in connection with their transfer of request and response packets over the network 46. In the discussion which follows, this is collectively referred to as the "memory system."

The illustrated system's processors, e.g., processors 40A, 40B, 40C, communicate with the memory system via two primary logical interfaces. The first is the data access interface, which is implemented by the load and store instructions. In data access mode, the processor presents the memory system with an SVA and access mode information, and the memory system attempts to satisfy that access by finding the subpage containing the data and returning it.

The second logical interface mode is control access, which is implemented by memory system control instructions. In control access, the processor instructs the memory system to perform some side effect or return some information other than the actual data from a page. In addition to the primary interfaces, the operating system 51 (e.g., the operating system) uses control locations in SPA space for configuration, maintenance, fault recovery, and diagnosis.

The memory system implements a hierarchy of storage. In the illustrated, preferred embodiment, each processing cell contains a central processing unit (or CEU) which has a subcache that stores 0.5 MBytes of data. Those processing cells also include caches, which store 32 MBytes of data. Moreover, a preferred level:0 having, for example, 15 processing cells stores a total of 480 MBytes. While, a preferred level:1 having, for example, 32 level:0's has a total of 15360 MBytes.

The memory system stores data in units of pages and subpages. For example, in the illustrated embodiment, each individual cache describes 32 Mbytes of SVA space, subdivided into 2048 pages. Pages contain $2^{14}$ (16384) bytes, divided into 128 subpages of $2^7$ (128) bytes. The memory system allocates storage in the caches on a page basis, and each page of SVA space is either entirely represented in the system or not represented at all. The memory system shares data between caches in units of subpages.

When a page of SVA space is resident in the system, the following are true:

(1) One or more caches allocates a page of storage to the page, each subpage of the page is stored on one or more of the caches with space allocated, but (2) Each cache with space allocated for a page may or may not contain a copy of all (or any) of the page's subpages.

A further appreciation of a preferred memory system for use in a digital data processing system constructed in accordance with the invention may be had by reference to the above-cited related applications, e.g., U.S. patent application Ser. No. 136,930, filed Dec. 22, 1987, now U.S. Pat. No. 5,055,999; U.S. patent application Ser. No. 370,287, filed Jun. 22, 1989, now U.S. Pat. No. 5,251,308; U.S. patent application Ser. No. 521,798, filed May 10, 1990, now U.S. Pat. No. 5,282,201; and U.S. patent application Ser. No. 531,506, filed May 31, 1990, now U.S. Pat. No. 5,341,483.

Subpage States

The subpage states are defined in terms of three classes of subpage states: invalid, read-only, and owner. These three classes are ordered in strength according to the access that they permit. Invalid states permit no access. Read-only state permits load and instruction-fetch access. There are several owner states: all permit load access and permit the cache to respond to a data request from the network 46; some permit store access. Only one cache may hold a particular subpage in an owner state at any given time. The cache that holds a subpage in an owner state is called the owner of the subpage. Ownership of each subpage moves from cache to cache as processors request ownership via store instructions, special load instructions, and atomic state instructions (e.g., gsp or rsp) that request ownership.

A further appreciation of preferred subpage states used in a digital data processing system constructed in accordance with the invention may be had by reference to the above-cited related applications, e.g., U.S. patent application Ser. No. 136,930, filed Dec. 22, 1987, now U.S. Pat. No. 5,055,999; U.S. patent application Ser. No. 370,287, filed Jun. 22, 1989, now U.S. Pat. No. 5,251,308; U.S. patent application Ser. No. 521,798, filed May 10, 1990, now U.S. Pat. No. 5,282,201; and U.S. patent application Ser. No. 531,506, filed May 31, 1990, now U.S. Pat. No. 5,341,483.

Cache Directories

The associations between cache pages and SVA pages are recorded by each cache in its cache directory. Each cache directory is made up of descriptors. There is one descriptor for each page of memory in a cache. At a particular time, each descriptor is said to be valid or invalid. If a descriptor is valid, then the corresponding cache memory page is associated with a page of SVA space, and the descriptor records the associated SVA page address and state information. If a descriptor is invalid, then the corresponding cache memory page is logically not in use. There is no explicit validity flag associated with a descriptor; a descriptor may be considered invalid if the anchor and held fields are both clear, and there are no valid subpages present for the SVA page.

Each cache directory acts as a content-addressable memory. This permits a cache to locate a descriptor for a particular page of SVA space without an iterative search through all of its descriptors. Each cache directory is implemented as a 16-way set-associative memory with 128 sets. All of the pages of SVA space are divided into 128 equivalence classes, each associated with a cache directory set. A descriptor for a page can only be stored in the set of a cache directory that corresponds to the page's equivalence class. The equivalence class is selected by SVA[20:14]. At any given time, a cache can describe no more than 16 pages with the same value for SVA[20:14], since there are 16 elements in each set.

Figure 5:
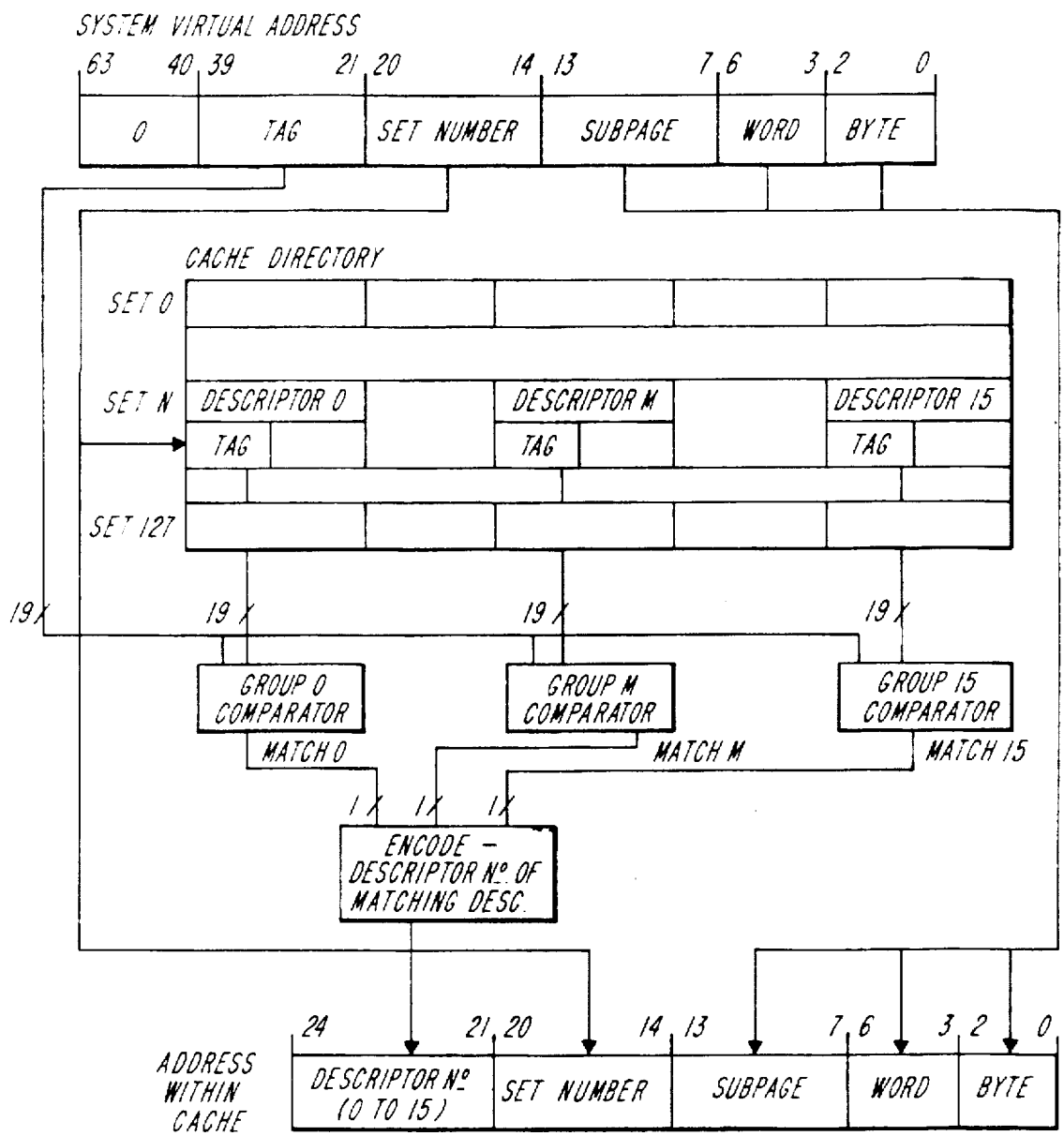
FIG. 5 depicts a preferred structure of a cache directory of the multiprocessing system of FIG. 1.

A preferred organization of a cache directory is shown in FIG. 5. When a reference to an SVA is made, the cache must determine whether or not it has the required information. This is accomplished by selecting a set within the cache, and then examining all the descriptors of that set. SVA[20:14] selects a set. In the general architecture, each of the descriptors in the selected set is simultaneously compared against SVA[63:21]. In a preferred embodiment having a 240 Mbyte SVA space, this implies a comparison with SVA[39:21]. If one of the elements of the set is a descriptor for the desired page, the corresponding comparator will indicate a match. The index in the set of the matching descriptor, concatenated with the set number, identifies a page in the cache.

If more than one descriptor matches, the cache signals a multiple descriptor match exception. If no descriptor matches, the cache allocates a descriptor and requests data from the network. It is possible that either the allocation or data request will fail, and the cache will indicate an error to the CEU.

The use of SVA[20:14] to select a set is effectively a hash function over SVA addresses. The operating system 51 must assign SVA addresses so that this hash function gives good performance in common cases. There are two important distribution cases: referencing many pages of a single segment and referencing the first page of many segments. This set selector produces good cache behavior for contiguous groups of pages, since 128 contiguous pages will reside in 128 distinct sets. However, this selector will produce poor hashing behavior for many pages with the same value in SVA[20:14]. The operating system 51 can avoid the latter situation by varying the logical origin of data within segments. For example, each per-process user stack can be started at a different segment offset.

Contents of a Descriptor

When a cell responds to a request for a subpage, it supplies the subpage data and the values of certain descriptor fields in the local cache. When the response returns to the requester it either copies those fields to descriptor fields (if it has no other valid subpages) or logically OR's those fields into descriptor fields. Some descriptor fields are never supplied by the responder nor updated by the requester.

The descriptor fields include, inter alia, the following:

descriptor.tag (19 bits)
   Bits [39:21] of an SVA. This field identifies the particular page of SVA space specified by the corresponding descriptor. For a given set in a given cell, this field must be unique among all 16 descriptors. Operating system 51 'sets' this field when it creates an SVA page. (It is also set by operating system 51 during cache initialization.)

descriptor.summary 1 (4 summary1s, 3 bits)
   Each page contains four summary1 fields. Each summary1 summarizes 4 summary2 fields called the summary2 set. SVA[13:12] selects one of four summary1 fields and corresponding summary2 set. Each summary2 set contains four summary2 fields. Some summary1 values override the value of summary2 fields. Summary1 is updated during each subpage reference for use by the Cache during descriptor replacement. Initialized to invalid by local cache descriptor allocation.

descriptor.summary2 (16 summary2s, 3 bits)
   Each summary2 summarizes 8 subpage state fields called the subpage set. SVA[13:10] selects one of sixteen summary2s within a page and SVA[11:10] selects one of four summary2 fields within the selected summary2 set. Some summnary2 values override the value of subpage state fields. Summary2 is updated during each subpage reference for use by the Cache during descriptor replacement.

descriptor.subpage_state (128 subpages, 4 bits)
   The subpage state consists of a three-bit state field and a single bit subcached status field. It is set by the cache to record the state of each subpage and to indicate whether or not any portion of the subpage is present in the CEU subcache. The subpage_state within a page is indexed by SVA[13:7]. Since the summary1 and summary2 fields can override the corresponding subpage_state field, the summary1, summary2 and supage_state fields must be read to determine the actual subpage state.

descriptor.fault (1 bit)
   A cache sets this bit flag when any hardware fault is detected in any data structure, cache operation or Ring Operation corresponding to the page or subpages described by this descriptor. Data structures include all descriptor fields and corresponding subpage data. Faults detected during cache or ring operations include local or remote rules and parity errors. The cache signals a descriptor_fault on any processor or ring reference to the subpages corresponding to this descriptor. It is cleared by the local cache descriptor allocation.

A further appreciation of preferred structures for the cache directory and descriptors, as well as of memory system control instructions, in a digital data processing system constructed in accordance with the invention may be had by reference to the above-cited related applications, e.g., U.S. patent application Ser. No. 136,930, filed Dec. 22, 1987, now U.S. Pat. No. 5,055,999; U.S. patent application Ser. No. 370,287, filed Jun. 22, 1989, now U.S. Pat. No. 5,251,308; U.S. patent application Ser. No. 521,798, filed May 10, 1990, now U.S. Pat. No. 5,282,201; and U.S. patent application Ser. No. 531,506, filed May 31, 1990, now U.S. Pat. No. 5,341,483.

Fault Detection—Overview

The illustrated system 10 supports detection of most single faults. All faults, including those which are transparently corrected by hardware are reported to system software. The system uses ECC circuitry to protect all DRAM. In this regard, the processing cell cache and RRC directories (e.g., cell cache 56A, FIG. 2) are partially implemented using DRAMs. Single bit errors are, thus, corrected.

The system 10 relies on software assisted memory scrubbing to minimize the probability of multiple bit errors. If the single bit error rate for a field replaceable unit (FRU) exceeds a threshold, the FRU is scheduled to be replaced.

The system 10 uses parity checking to detect errors and to protect other RAM structures. This includes all visible and transparent locations. Likewise, the system uses parity checking to protect all data transfers over interconnects and buses. The interconnection between RRC:0s and RRC:1s, the InterRingLink is protected by a checksum. For a more complete understanding of this interconnection see the aforementioned related applications, for example, in co-pending, commonly assigned application U.S. patent application Ser. No. 521,798, filed May 10, 1990, now U.S. Pat. No. 5,282,201.

The processing cells (e.g., 18K) and RRC's (e.g., 28D) detect memory system protocol ownership and logical inconsistencies. These include, for example, inconsistencies in memory system state such as dual subpage ownership or inappropriate commands are detected. Memory system faults are confined by a flag within each descriptor which records that the descriptor of the data which it describes might have been damaged.

Hardware faults are detected and reported by all caches and RRCs which participate in the corresponding request and/or response. Faults are reported differently depending on whether they are newly detected, or were previously detected. Missing response, on the other hand, are detected by request timeouts used by requesting processing cells.

The disk subsystem, e.g., 19B, can provides redundancy to handle disk drive and most device controller failures. This is accomplished by a parity and checksumming technique which tolerates a single failure across each array of 5 disk drawers. In addition, an error correcting code allows small burst errors to be corrected by device controller. If correctable errors for a disk exceed a threshold, the disk should be replaced.

System software faults are, to a degree, detected by individual watchdog timers on each cell.

Fault Containment—Overview

The system 10 detects, reports and records all hardware faults in the local directory (e.g., 56A) of all caches (e.g., 42A) and RRCs (e.g., 28F) which participate in the corresponding request and/or response. All faults are categorized as newly detected faults and previously detected faults, in the manner described below.

When a processing cell (e.g., 18A) detects a memory system fault, e.g., a descriptor or data fault, it sets a fault flag within the descriptor to indicate that it or the data it describes might have been damaged. Such a fault is contained by preventing subsequent SVA access (and any movement of the date within the system) to the damaged pages by signaling that a fault has been previously detected.

Software Analysis and Reconfiguration

In operation, the sequence of steps executed by the system 10 from the time of error detection to FRU replacement is as follows:

1. The system hardware (e.g., cell 18A) detects a processor or memory system fault and contains it to within a single cell and single page.
2. System software then analyzes the reported error and determines which page(s) or subpage(s) within the effected cell(s) are damaged. The remaining pages are then removed from the faulty cell(s). The faulty cell(s) are then deconfigured and the Ring:0s, RRCs and Ring:1s are approximately reconfigured.
3. At this point, system software can determine which processes or file(s) are dependent on the damaged data. If the applications are not fault tolerant, the process(s) can be killed with error status, and file(s) marked as damaged. Damaged files return error status file system calls and page faults are returned for loads or stores. If a process or application with damaged data is designed as fault tolerant (for example using checkpoint/restart capability), its threads can be restarted from the last checkpoint. See, aforementioned related application U.S. patent application Ser. No. 763,505, filed Sept. 20, 1991, now U.S. Pat. No. 5,313,647.
4. Replacement of failed, deconfigured modules can in most cases occur at the users operations convenience without bringing down the system. Under system software control individual Ring:0 modules or Ring:1 modules can be deconfigured for card replacement. System software allows on-line disk drawer replacement and automatic re-synchronization with current file system state in redundant and mirrored configurations.

Descriptor.Fault Flag

A cache (e.g., 42A, FIG. 2A) sets the descriptor.fault flag when a hardware fault is detected in any data structure associated with the page (descriptor, summary subpage state or data), or during any cache or ring operation corresponding to the page of subpages described by the descriptor. The descriptor.fault flag marks pages which may have been damaged by a hardware fault for later software analysis. Fault containment is achieved by preventing all local or remote SVA access to the damaged page.

Synchronous Errors

When a cache detects a fault during a sequence for which a processor response is required, the fault is signaled as a synchronous error. The local cache records the fault and signals an exception to the local processor, and if a response packet is required to a remote request, the fault category is signaled in the packet. The processor then signals the corresponding exception. The local cache records the fault category and detailed fault type in control location ctl$ccu__sync_error and the address (SVA or SPA) in control location ctl$ccu__sync_error addr.

Asynchronous Errors

When a cache detects a hardware fault while executing a request that does not require a processor response (or it is unknown whether a processor response is required), the fault is signaled as a synchronous error. The local cache records the fault, signals an interrupt to the local processor and if a response packet is required to a remote request, the fault category is signaled in the packet. The local cache records the fault category and detailed fault type in ctl$ccu__async__error and the SVA or SPA in ctl$ccu__async__error__addr control locations.

Fault Recording

Previously detected faults are reported in the packet or locally indicated by descriptor.fault field. All detected faults which affect the correctness of the response packet are signaled with the packet. Faults relating to other subpages within the same page, which are detected after the packet command is transmitted to the Cell Interconnect, are not signaled in the response packet, but are signaled locally. These faults are related to summary1s, summary2s and subpage state fields corresponding to subpage other than the subpage in the packet, which are accessed during packet processing.

Uncorrectable ECC errors are signaled within the response packet by generating bad parity on the corresponding words.

The local cache error locations record the first synchronous and asynchronous errors detected. Coincident faults may be captured by reporting one fault per field. Coincident faults within a single field are reported on a priority basis. Subsequent faults are indicated until the fault indication is cleared, by setting the multiple error flag in the corresponding error location, rather than the error type and address. Reading the corresponding error locations clears the error location and allows the next detected error to be fully recorded.

Hardware faults detected by RRC or Ring Interconnect are recorded in the corresponding request and/or response packet if possible. The RRC also logs each detected fault in an RRC internal error queue. Once a fault other than RRC Fault has been recorded in a packet, the packet is ignored by all caches except the requester.

Fault Categories and Packet Fault Fields

Hardware detected faults are broken into five categories for signaling faults locally and within a packet to the detector and requestor caches. The detector also records the detailed fault type. A fault described as signaled locally does not signal any of the five fault categories.

An overview of the fault categories and responses by system 10 is provided in FIG. 6.

The fault detector, i.e., the cell that first detected the fault, prioritizes coincident faults in the priority order: previously detected fault signaled in received packet, newly detected DescriptorFault, newly detected UnMarkedFault, newly detected MarkedFault and LocalFault. The requester signals all faults reported in the response packet. The local Cache sets descriptor.fault, when LocalFault and MarkedFault are simultaneously signaled.

An understanding of the mechanism used by the processing cells and ring routing cells to construct and route response packets may be attained by reference to the aforementioned related patent application, for example, U.S. patent application Ser. No. 696,291, filed May 20, 1991, now U.S. Pat. No. 5,119,481; and U.S. patent application Ser. No. 499, 182, filed Mar. 26, 1990, now U.S. Pat. No. 5,335,325.

Marked Faults

A marked fault indicates that a new fault was detected (descriptor.fault flag previously not set) and isolated to the faulting page(s). The detecting cache sets the fault flag within the descriptor corresponding to the faulting page, if the descriptor is available. The fault is reported to the cell which detected the error and to the requesting cell if possible.

The detecting processing cell sets a field within the response packet, the MarkedFault field, is used to signal the fault to the requestor cell. The packet is ignored by cells which process the packet after the fault has been detected and signaled in the packet. Subsequent SVA references to the descriptor or subpages in the detecting cell will signal descriptor_fault of a response is required.

UnMarked Faults

An unmarked fault indicates that a new fault was detected (descriptor.fault flag previously not set), but was not isolated to the faulting page. The fault is reported to the cell which detected the error, and to the requesting cell if possible.

The detecting processing cells sets the UnMarkedFault field in the response packet to signal the fault to the requester cell. The packet is ignored by cells which process the packet after the fault has occurred. Since the fault could not be contained to a page(s) within the detecting cell, an unknown number of pages might be damaged. Integrity is only guaranteed for pages for which OwnerLimit prevented the Ring:0 which detected the error from gaining ownership.

Descriptor Faults

A descriptor fault indicates that a Fault has been previously detected, as indicated by descriptor.fault flag corresponding to the page being set. The fault is reported to the requesting cell through the packet DescriptorFault field. The packet is ignored by cells which process the packet after the fault has been signaled in the packet.

Local Faults

A local fault indicates that the local Cell Interconnect (CIUs) or Routing Interconnect (RIUs) has detected a fault in a Ring packet or while processing a Ring packet. The detecting cache (e.g., 42A) signals this fault within the local cell only. The cell interconnect (e.g., 22F) also appropriately sets either Marked or UnMarkedFault.

The local cache sets descriptor.fault, when LocalFault and MarkedFault are simultaneously signaled. The cell interconnect or routing interconnect (e.g., 32D of FIG. 1) always shortens the copied or extract packet corresponding to the LocalFault.

A non-requesting cell, or a cell without a pending request, for a datum contained in a response packet might not copy or extract the packet if its extract FIFO is full. The original requestor always copies or extracts the packet based on either SVA match if address has correct parity or Requested match if Requested has correct parity. A cell with a pending request might copy or extract the packet based on SVA match if address has correct parity. If all extract FIFOs are temporarily full, the packet would be emptied as a timestamp error and fault signaled as a requestor time-out.

RRC Faults

An RRC fault indicates that the RRC is signaling that it has one or more entries recorded in its fault queue. RRCFault does not necessarily indicate that a fault has been detected while processing the specific packet in which the RRCFault field is set.

A requesting cell that receives the response packet with RRCFault set processes the packet normally, but signals an RRCFault. The packet is processed normally by other cells. The RRC will signal a MarkedFault (RRC sets a descriptor.fault bit within RRC directory), UnMarked Fault or DescriptorFault if the RRC fault prevents successful completion of this request or might damage a subpage or page.

Fault Itemization

FIGS. 7A through 7D more completely detail the faults and actions taken by system 10 in response to detected errors. As noted in the illustration, if a fault is detected during an allocate sequence, the sequence is aborted and the fault is signaled as indicated in FIGS. 7A through 7D.

Memory System Fault Containment

The local Cache achieves fault containment by freezing all directory data structures and subpage data which might have been damaged by the hardware fault. Freezing is accomplished by preventing all SVA access to the potentially damaged pages. Two mechanisms are used for fault containment, descriptor.fault flag and subcache disable flag.

Descriptor.Fault Marking

The descriptor.fault flag marks pages which may have been damaged by a hardware fault for later software analysis. This flag is set by the local cache when it detects a fault in any data structure, cache operation or ring operation corresponding to the page or subpages described by the descriptor. Fault containment is achieved by preventing all local or remote SVA access to the damaged page. The cache signals a descriptor fault error in the packet or to the local processor, on any processor or ring reference to the page or subpages corresponding to the descriptor.

SubCacheDisable Field

Each processor (e.g., 42A) includes an associated subcache (not shown) that stores data currently being accessed by the processor. A processing cell contains processor and subcache faults by disabling local cache access to the subcache when a subcache or processor fault is detected by the processor or when the cache detects a fault which might leave the subcache incoherent with respect to the Cache (for example subcache invalidate failure).

Local and remote cache access to the subcache are enabled by the SubCacheDisable field in ccu_master_ config location. SubCacheDisable is set by assertion of CellReset, RingReset or failure of CCU originated inserted instruction sequence. CellReset is asserted when a subcache hardware fault is detected, watchdog timer expiration or double trap reset. SubCacheDisable is guaranteed to be asserted prior to any data which might have been damaged from the subcache hardware fault leaving being passed to the Cache or XIO Bus. SubCacheDisable is set or cleared by SPA access from local or remote cell.

When clear, SubCacheDisable enables the Local Cache to issue inserted instructions to the subcache. CCU inserted instructions are used to deliver subcache invalidate and xtrap sequences to the processor. When set, the CCU is disabled from issuing subcache invalidate requests to the subcache and subcache coherency is not maintained. The CCU signals DescriptorFault to any remote request, for which only the subcache contains the correct subpage data. The subcached state is ignored for the remaining cases where the Local Cache contains the correct data. Since subcache coherency is not maintained when SubCacheDisable is set, SubCacheDisable must be clear prior to subcaching of any subpage.

FIG. 8 specifies SubCacheDisable actions taken by the processing cells of the illustrated system 10. It will be noted that the descriptor.fault flag is not set by any of the actions specified in that table.

SubcacheDisable is ignored for processor requests to the Local Cache which do not require an inserted instruction sequence. Memory control instructions mflsp, mrcsp, rsp and pstsp have exceptional behavior when SubcacheDisable is set and the referenced subpage is subcache, since an inserted instruction sequence is required.

The subcache must not be accessed by memory reference instruction when Subcache Disable has been asserted, until the subcache has been cleaned up. An example of undesirable behavior after an error has occurred would be: implied subcache actions such as write backs could writeback a stale subpage into the cache and turn off subcached, thus injecting a stale subpage into the cache without any error being noted.

SubCache Hardware Faults

The following subcache hardware faults cause SubCacheDisable to be asserted. This assertion is guaranteed prior to any data being passed to the Cache or XIO Bus which might have been damaged from the subcache hardware fault leaving: Subcache Instruction Bus parity error; Subcache Data Bus parity error; Instruction Cache Group parity error; Data Cache Group parity error; Instruction Subcache multimatch; Data Subcache multimatch; Instruction Subblock State parity error; and Data Subblock State parity error.

Summary

The foregoing describes an improved digital data processing apparatus meeting the aforementioned objects. Particularly, it describes a distributed memory multiprocessor system capable of detecting and containing faults.

Those skilled in the art will appreciate that the embodiments described above are exemplary only, and that other apparatuses and method—including modifications, additions and deletions—fall within the scope and spirit of the invention.

By way of example, it will be appreciated that a digital data processing system constructed in accordance with the invention include additional fault detection mechanisms, apart from the parity and ECC mechanisms, among others, described above.

It will also be appreciated that the techniques and apparatus described and claimed herein are applicable to digital data apparatus other than the illustrated multiprocessor system.

In view of the foregoing, what we claim is:

1. In a digital data processing apparatus of the type having
  a plurality of processor means for processing data, each processing unit including request means for generating a request signal representative of a request for access to a datum and for transmitting that request signal on a network means, a processor means generating such a request signal being referred to as a requestor,
  at least one memory means for storing data,
  said network means being coupled to said processor means and said memory means for transferring signals therebetween,
the improvement wherein
  A. said memory means includes response means for responding to at least a selected request signal for accessing the requested datum and, absent fault, transmitting a response signal including that datum on the network means at least to the requestor,
  B. said response means includes fault containment means for responding to a fault in connection with at least one of accessing and transmitting the requested datum for generating said response signal to include a fault signal for preventing access by at least said requester to that datum.

2. In a digital data processing apparatus according to claim 1, the further improvement wherein said fault containment means includes fault detection means for detecting a fault in connection with at least one of the accessing and transmitting of said requested datum, said fault detection means including at least one of:
  A. marked fault means for responding to a newly detected fault isolated to the requested datum for generating said response signal to include fault signal representative of a fault in a first fault category,
  B. unmarked fault means for responding to a fault that is not isolated to the requested datum for generating said response signal to include a fault signal representative of a fault in a second fault category,
  C. descriptor fault means for responding to a request for a datum for which a fault had previously been detected for generating said response signal to include a fault signal representative of a fault in a third fault category,
  D. local fault means for responding to a fault by the associated memory means in transmitting said response signal on said network means for generating said response signal to include a fault signal representative of a fault in a fourth fault category, and
  E. remote fault means for responding to a fault signaled by said network means for generating said response signal to include a fault signal representative of a fault in a fifth fault category.

3. In a digital data processing apparatus according to claim 2, the further improvement wherein
  A. at least one processor means other than said requester includes
    i) means for storing a status relating to a datum, and
    ii) means for normally processing at least selected ones of said response signals by at least updating said status, and
  B. said fault containment means includes means for disabling that other processing means from processing a response signal that includes said fault signal.

4. In a digital data processing apparatus according to claim 2, the further improvement wherein
  A. each of at least one processor means is associated with a respective one of said memory means, said processor means and associated memory being referred to as a processing cell.

B. said processing cell includes subcache means coupled to the associated processor means for storing data for processing thereby.

C. said memory means includes
  i) cache memory means for storing data.
  ii) control means coupled to said subcache means and said cache memory means for accessing, absent fault, in said cache memory means at least selected data requested by the associated central processing unit.

D. said control means includes subcache disable means for responding to at least selected faults in operation of at least one of said subcache means and said cache memory means for preventing the transfer of data therebetween.

5. In a digital data processing apparatus as in any one of claims 1, 2, 3, 4, the further improvement wherein at least one of said requester and responder include means responsive to said fault signal for initiating analysis of said fault.

6. In a digital data processing apparatus as in any one of claims 1, 2, 3, 4, the further improvement wherein A. each of at least selected ones of said data are associated with a descriptor signal by which that data is referenced, and B. said memory means further includes means for modifying, in the event of selected fault, the descriptor associated with a requested datum to reflect such fault.

7. A digital data processing apparatus comprising

A. one or more processor means for generating requests for access to data stored in a plurality of memory means, each said memory means for storing data.

B. at least a responding one of which memory means comprises means responsive to a selected request for accessing the requested datum in that memory means and for generating a digital signal response packet inclusive thereof.

C. network means coupled to said plural memory means for transferring said digital signal packet therebetween.

D. at least a target one of which memory means includes means normally responsive to a selected response packet for storing the datum contained therein.

E. fault-detection means coupled to said memory means and to said network means for detecting at least a selected fault in connection with the access of said datum and the transfer thereof in said digital signal packet, and F. said fault-detection means including marking means responsive to such fault condition for including in that digital packet a signal representative thereof.

8. A digital data processing apparatus according to claim 7, wherein

A. said fault-detection means includes means for detecting a selected fault condition isolated to a datum not previously detected as faulty,
said marking means includes means responsive to that fault condition for including in the packet transferring that datum a marked fault signal representative thereof.

B. said fault-detection means includes means for detecting a selected fault condition relating to a datum not previously detected as faulty, which fault is not isolated to that datum, and
said marking means includes means responsive to that fault condition for including in the packet transferring that datum an unmarked fault signal representative thereof.

9. A digital data processing apparatus according to claim 8, wherein

A. said fault-detection means includes means for detecting a request for access to a datum previously detected as faulty, and B. said marking means includes means responsive to such detection for including, in the packet transferring that datum, a descriptor fault signal indicating that the request was made to a datum previously detected as faulty.

10. A digital data processing apparatus according to claim 7, wherein

A. at least said responding memory means includes directory means for storing a fault flag, associated with a corresponding datum, which fault flag is not set in the absence of fault in that datum, is not set, and B. said fault-detection means includes means for detecting a selected fault condition isolated to a datum not previously detected as faulty,
said marking means includes means responsive to that fault condition for setting the fault flag corresponding to that datum C. said fault-detection means includes means for detecting a request for access to a datum for which the corresponding fault flag is set, and
said marking means includes means responsive to that detection for including in the packet transferring that datum a descriptor fault signal indicating that the request was made for a datum previously detected as faulty.

11. A digital data processing apparatus according to claim 7, wherein

A. said network means includes bus means including
  i) a plurality of segment means each for carrying said digital signal packets, and
  ii) routing means coupled to respective pairs of said segment means for selectively transferring digital signal packets therebetween.

B. said fault-detection means includes means for detecting a fault in the transfer of a digital signal packet by said routing means, and C. said marking means includes means responsive to that fault condition for including in that digital signal packet a remote fault signal representative thereof.

12. A digital data processing apparatus according to claim 11, wherein

A. said network means includes (i) bus means for carrying said packets, and (ii) a plurality of control means, each coupled to a respective one of said memory means and to said bus means, for selectively transferring said packets therebetween, B. said fault-detection means includes means for detecting a fault in the transfer of a digital signal packet by said control means, and C. said marking means includes means responsive to that fault condition for including in that digital signal packet a local fault signal representative thereof.

13. A digital data processing apparatus as in any one of claims 8, 9, 11, 10, 12, wherein said target memory means comprises means responsive to a selected response packet including said fault signal for preventing storage in that memory means of the datum contained in that response packet.

14. A digital data processing apparatus as in any one of claims 8, 9, 11, 10, 12, wherein at least one memory means other than said responding memory means comprises
   A. means for storing a status relating to a datum in a response packet,
   B. means for normally updating that status in response to transfer of a response packet containing that datum, and
   C. means responsive to said fault signal in a packet containing that datum for preventing updating of that status.

15. A digital data processing apparatus as in any one of claims 8, 9, 11, 10, 12, wherein
   A. at least one said processor means is associated with a respective one of said memory means, said processor means and associated memory being referred to as a processing cell,
   B. said processing cell including subcache means coupled to the associated processor means for storing data for processing thereby,
   C. said memory means includes
      i) cache memory means for storing data,
      ii) control means coupled to said subcache means and said cache memory means for accessing, absent fault, in said cache memory means at least selected data requested by the associated central processing unit,
   D. said control means includes subcache disable means for responding to at least selected faults in operation of at least one of said subcache means and said cache memory means for preventing the transfer of data therebetween.

16. A digital data processing apparatus as in any one of claims 7, 8, 9, 11, 10, 12, wherein
   A. each said datum is associated with an address by which that datum is referenced, and wherein the addresses associated with the data stored in said plurality of memory elements comprise a single virtual address space,
   B. said one or more processor means include means for generating said request for access specifying the address associated with the requested datum, and
   C. at least said responding memory means includes means selectively responsive to said specified address for accessing the requested datum therein.

17. A digital data processing apparatus as in any one of claims 7, 8, 9, 11, 10, 12, wherein at least one of said memory means includes responsive to said fault signal for initiating analysis of said fault.

18. A digital data processing apparatus as in any one of claims 7, 8, 9, 11, 10, 12, wherein at least said responding memory means includes
   A. directory means for storing a fault flag, associated with a corresponding datum, which fault flag is not set in the absence of fault in that datum, and
   B. said fault-detection means includes means responsive to at least a selected fault condition associated with that datum for setting that fault flag.

19. A method of operating a digital data processing apparatus of the type having
   a plurality of processor means for processing data, each processing unit including request means for generating a request signal representative of a request for access to a datum and for transmitting that request signal on a network means, a processor means generating such a request signal being referred to as a requestor,
   at least one memory means for storing data,
   said network means being coupled to said processor means and said memory means for transferring signals therebetween,
   the method comprising the steps of
   A. responding to at least a selected request signal for accessing the requested datum in said memory means and, absent fault, transmitting a response signal including that datum on the network means at least to the requester.
   B. responding to a fault in connection with at least one of accessing and transmitting the requested datum for generating said response signal to include a fault signal for preventing access by at least said requester to that datum.

20. A method according to claim 19, comprising the steps of
   A. detecting a fault in connection with at least one of the accessing and transmitting of said requested datum, and
   B. selectively executing, in response to such detection, at least one of the following steps
      i) responding to a newly detected fault isolated to the requested datum for generating said response signal to include fault signal representative of a fault in a first fault category,
      ii) responding to a fault that is not isolated to the requested datum for generating said response signal to include a fault signal representative of a fault in a second fault category,
      iii) responding to a request for a datum for which a fault had previously been detected for generating said response signal to include a fault signal representative of a fault in a third fault category,
      iv) responding to a fault by the associated memory means in transmitting said response signal on said network means for generating said response signal to include a fault signal representative of a fault in a fourth fault category, and
      v) responding to a fault signaled by said network means for generating said response signal to include a fault signal representative of a fault in a fifth fault category.

21. A method according to claim 20, comprising the steps of
   A. storing, within at least one memory means other than said requestor, a status relating to a datum, and normally responding to at least selected ones of said response signals for updating said status, and
   B. disabling that other processing cell from processing a response signal that includes said fault signal.

22. A method according to claim 20, wherein each of at least one processor means is associated with a respective one of said memory means, said processor means and associated memory being referred to as a processing cell, said method comprising the steps of
   A. providing said processing cell with subcache means coupled to the associated processor means for storing data for processed thereby,
   B. providing said memory means with cache memory means for storing data, and control means coupled to said subcache means and said cache memory means for accessing absent fault, in said cache memory means at least selected data requested by the associated central processing unit, and
   C. responding to at least selected faults in operation of at least one of said subcache means and said cache memory means for preventing the transfer of data therebetween.

23. A method as in any one of claims 19, 20, 21, 22, comprising the step of responding to said fault signal for initiating analysis of said fault.

24. A method as in any one of claims 19, 20, 21, 22, wherein each of at least selected ones of said data are associated with a descriptor signal by which that datum is referenced, said method comprising the step of modifying, in the event of selected fault, the descriptor associated with a requested datum to reflect such fault.

25. A method of operation a digital data processing apparatus comprising
  A. providing one or more processor means for generating requests for access to data stored in a plurality of memory means, each said memory means for storing data.
  B. responding to a selected request for accessing a requested datum in a memory means and generating a digital signal response packet inclusive of that datum,
  C. transferring said digital signal packet between said plural memory means,
  D. normally responding to a selected response packet for storing the datum contained therein in another memory means,
  E. detecting at least a selected fault in connection with the access of said datum and the transfer thereof in said digital signal packet, and
  F. responding to such fault condition for including in that digital packet a signal representative thereof.

26. A method according to claim 25, comprising
  A. detecting a selected fault condition isolated to a datum not previously detected as faulty,
    responding to that fault condition for including in the packet transferring that datum a marked fault signal representative thereof.
  B. detecting a selected fault condition relating to a datum not previously detected as faulty, which fault is not isolated to that datum, and
    responding to that fault condition for including in the packet transferring that datum an unmarked fault signal representative thereof.

27. A method according to claim 26, comprising
  A. detecting a request for access to a datum previously detected as faulty, and
  B. responding to such detection for including, in the packet transferring that datum, a descriptor fault signal indicating that the request was made to a datum previously detected as faulty.

28. A method according to claim 25, comprising
  A. storing a fault flag, associated with a corresponding datum, which fault flag is not set in the absence of fault in that datum,
  B. detecting a selected fault condition isolated to a datum not previously detected as faulty, responding to that fault condition for setting the fault flag corresponding to that datum
  C. detecting a request for access to a datum for which the corresponding fault flag is set, and responding to that detection for including in the packet transferring that datum a descriptor fault signal indicating that the request was made for a datum previously detected as faulty.

29. A method according to claim 25, comprising
  A. providing a bus means including a plurality of segment means each for carrying said digital signal packets, and routing means coupled to respective pairs of said segment means for selectively transferring digital signal packets therebetween.
  B. detecting a fault in the transfer of a digital signal packet by said routing means, and
  C. responding to that fault condition for including in that digital signal packet a remote fault signal representative thereof.

30. A method according to claim 29, comprising
  A. providing said network means with (i) bus means for carrying said packets, and (ii) a plurality of control means, each coupled to a respective one of said memory means and to said bus means, for selectively transferring said packets therebetween,
  B. detecting a fault in the transfer of a digital signal packet by said control means, and
  C. responding to that fault condition for including in that digital signal packet a local fault signal representative thereof.

31. A method as in any one of claims 26, 27, 29, 28, 30, comprising responding to a selected response packet including said fault signal for preventing storage in that memory means of the datum contained in that response packet.

32. A method as in any one of claims 26, 27, 29, 28, 30, comprising
  A. storing a status relating to a datum in a response packet,
  B. normally updating that status in response to transfer of a response packet containing that datum, and
  C. responding to said fault signal in a packet containing that datum for preventing updating of that status.

33. A method as in any one of claims 25, 26, 27, 29, 28, 30, wherein each said datum is associated with an address by which that datum is referenced, and wherein the addresses associated with the data stored in said plurality of memory elements comprise a single virtual address space, comprising the steps of
  A. generating said request for access specifying the address associated with the requested datum, and
  B. selectively responding to said specified address for accessing the requested datum therein.

34. A method as in any one of claims 25, 26, 27, 29, 28, 30, comprising responding to said fault signal for initiating analysis of said fault.

35. A method as in any one of claims 25, 26, 27, 29, 28, 30, comprising
  A. storing a fault flag, associated with a corresponding datum, which fault flag is not set in the absence of fault in that datum, and
  B. responding to at least a selected fault condition associated with that datum for setting that fault flag.

* * * * *